United States Patent [19]
Ra et al.

[11] Patent Number: 5,364,320
[45] Date of Patent: Nov. 15, 1994

[54] CONTINUOUSLY-GEARED AUTOMATIC TRANSMISSION WITH CONTROLLING BRAKES

[75] Inventors: Jong O. Ra, 24/1,265-154 Bokwang-Dong, Yongsan-Gu, Seoul; Joon Y. Lim, Duckyong, Villa Ka-204, 141-2, Duckjeong-Ri, Hoecheon-Uep, Yangju-Gun, Kyungki-Do; Wan M. Yoo, Incheon, all of Rep. of Korea

[73] Assignees: Jong Oh Ra; Joon Young Lim, both of Rep. of Korea

[21] Appl. No.: 28,824

[22] Filed: Mar. 10, 1993

[51] Int. Cl.$^5$ ............................................. F16H 3/62
[52] U.S. Cl. ..................................... 475/280; 475/311
[58] Field of Search ........................ 475/1, 2, 150, 280, 475/311, 317, 330, 338, 339

[56] References Cited

U.S. PATENT DOCUMENTS

| | | | |
|---|---|---|---|
| 4,010,653 | 3/1977 | Mekjian | 475/311 OR |
| 4,027,552 | 6/1977 | Murakami et al. | 475/280 X |
| 5,062,823 | 11/1991 | Ra et al. | 475/330 |
| 5,141,477 | 8/1992 | Oshidari | 475/280 X |

FOREIGN PATENT DOCUMENTS 1415523 11/1975 United Kingdom.
2160598 12/1985 United Kingdom.

*Primary Examiner*—Dirk Wright
*Attorney, Agent, or Firm*—Merchant, Gould, Smith, Edell, Welter & Schmidt

[57] ABSTRACT

A continuous automatic variable speed transmission comprising an input sun gear 14 or receiving rotational power, an input differential gear 38A meshed with the input sun gear 14, an output differential gear 42A and a reverse rotation differential gear 46A integrally formed with the input differential gear 38A, a transmission differential gear 54A meshed with the input differential gear 38A, a medium speed differential gear 58A integrally formed with the transmission differential gear 54A, locking pins 36A, 52A and carriers 32, 34 supporting each differential gear, an output sun gear 24 integrally formed with an output shaft 22 and meshed with the inside of the output differential gear 42A, a medium speed sun gear 28 integrally formed with a medium speed control shaft 26 and meshed with the inside of the medium speed differential gear 58A, a reverse rotation sun gear 18 integrally formed with a reverse rotation control shaft 16 and meshed with the inside of the reverse rotation differential gear 46A, a low speed control shaft 30 integrally formed with the carrier 32 for control of the low speed, and a low speed, medium speed and reverse rotation brake means 62, 64, 66 and an interlocking means 70 for performing the speed variation at each stage is disclosed.

21 Claims, 15 Drawing Sheets

CONTINUOUSLY-GEARED AUTOMATIC TRANSMISSION WITH CONTROLLING BRAKES

BACKGROUND OF INVENTION

1. Field of the Invention

The invention relates to a transmission, and more particularly to a continuous automatic transmission constructed in such a way that when changing speed or when desiring reverse operation, power input to an input shaft can be converted and output to an output shaft to provide forward or reverse operation without changing or disengaging gears necessary for attaining such operation.

2. Information Disclosure Statement

Generally, a transmission changes speed by manual selection of a predetermined gear ratio. Careful attention is necessary since the gears must be shifted (changed or disengaged) when changing speed. Existing automatic transmissions are complicated and require a large space for installation. Also present day automatic transmissions are expensive to produce.

To solve the above described problems U.S. Pat. No. 5,062,823 entitled: Continuously Variable Transmission with Controlling Brakes, issued on Nov. 5, 1991. However, the transmission described in the above patent document requires a separate means for attaining reverse operation, i.e. backward motion.

U.S. patent application Ser. Nos. 07/903,137 filed Jun. 23, 1992; 07/921,050 filed Jul. 28, 1992; and 07/920,892 filed Jul. 28, 1992 teach a transmission which includes reverse operation of the output shaft.

The present invention vastly improves upon the construction of the transmissions described in the above applications. That is, an output shaft is integrally formed with a carrier in the above applications; whereas, the output shaft is provided with an output sun gear in the present invention.

Therefore, the object of the present invention is to provide a continuous automatic transmission which can solve all of the above problems, which can rapidly respond to a change in the load without using a clutch or complicated mechanisms, which can smoothly transmit rotational force to an output shaft, which facilitates smooth reverse driving, and which is of a simple construction.

The preceding objects should be construed as merely presenting the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The continuous automatically variable transmission of the present invention is defined by the claims with a specific embodiment shown in the attached drawings. For the purpose of summarizing the invention, the present invention relates to an automatic variable speed transmission which comprises an input shaft 12 with a first end 12A and a second end 12B for receiving rotational input from a gasoline engine or the like. The input shaft further includes an input sun gear 14 secured to the input shaft between the first end 12A and the second end 12B of the input shaft to enable simultaneous rotation of the sun gear 14 with the input shaft 12. A reverse rotation control shaft 16 is rotatably and coaxially mounted on the input shaft to enable independent rotation about the input shaft 12. The control shaft 16 further includes a reverse rotation sun gear 18 secured to the shaft 16 to enable simultaneous rotation of the sun gear 18 with the reverse rotation control shaft 16. An output shaft 22 is used which has a first end 22A and a second end 22B with an output sun gear 24 secured to the first end 22A of the output shaft 22. An axial bore 20 is formed in the first end of the output shaft to coaxially receive therein the second end 12B of the input shaft 12 to enable independent axial rotation of the output shaft 22 and the input shaft 12. A medium speed control shaft 26 having a first end 26A and a second end 26B is used. A medium speed sun gear 28 is secured to the first end 26A of the shaft 26 which is rotatably and coaxially mounted on the output shaft 22 to enable independent rotation about the output shaft 22. A low speed control shaft 30 having a first 30A end and a second 30B end is used. A first carrier 32 is secured at the first end 30A of the shaft 30. The low speed control shaft is rotatably and coaxially mounted on the reverse rotation control shaft 16 to enable independent rotation about the reverse rotation control shaft. A second carrier 34 is rotatably and coaxially mounted on the medium speed control shaft 26 to enable independent rotation about the medium speed control shaft 26. A plurality of locking pins 36, 52 are employed with each locking pin 36A, 52A of the plurality of locking pins 36,52 secured to and interlinking the first and the second carriers 32, 34 to enable simultaneous rotation of the carriers 32, 34. A plurality of reverse rotation differential gears 46 is used with each reverse rotation differential gear 46A being in mechanical communication with the reverse rotation sun gear 18. A plurality of output differential gears 42 is used with each output differential gear 42A being in mechanical communication with the output sun gear 24. A plurality of input differential gears 38 is used with each input differential gear 38A interconnected to a reverse rotation differential gear 46A of the plurality of reverse rotation differential gears 46 and further interconnected to an output differential gear 42A of the plurality of output differential gears 42. The interconnected input differential 38A, output differential 42A and reverse rotation differential 46A gears are rotatably mounted on a locking pin 36A of the plurality of locking pins 36 to enable simultaneous rotation about locking pin 36A. Each input differential gear 38A is in mechanical communication with the input sun gear 14. A plurality of transmission differential gears 54 is used with each transmission differential gear 54A being in mechanical communication with each input differential gear 38A. A plurality of medium speed differential gears 58 is used with each medium speed differential gear 58A interconnected to a transmission differential gear 54A of the plurality of differential gears 54. The interconnected medium speed differential 58A and the transmission differential 54A gears are rotatably mounted on a locking pin 52A of the plurality of locking pins 52 to enable simultaneous rotation about the locking pin 52A. Each medium speed differential gear 58A is in mechanical communication with the medium speed sun gear 28. A low speed brake means 62 is used for applying rotational resistance to the low speed control shaft 30 in order to provide low speed rotation of the output shaft 22. A medium speed brake means 64 is used for applying rotational braking force to the medium speed control shaft 26 in order to provide medium speed rotation of the output shaft 22. An interlocking means 70 is used for coupling the rotation of the input shaft 12 and the reverse rotation control shaft 16 in order to provide increased rotation of the output shaft upon gradual interlocking and to provide high speed rotation of the output shaft upon complete interlocking such that the input shaft and the reverse rotation control shaft 16 rotate at the same speed. A reverse rotation brake means 66 is used for applying rotational braking force to the reverse rotation control shaft 16 in order to provide reverse rotation of the output shaft 22.

In the second embodiment of the present invention, the automatic variable speed transmission comprises an input shaft 12 with a first end 12A and a second end 12B for receiving rotational input and further including an input sun gear 14 secured between the first end 12A and the second end 12B of the input shaft. A medium speed control shaft 26 is used having a first 26A and a second 26B end with a medium speed sun gear 28 secured to the first end 26A of the control shaft 26 with the shaft 26 being rotatably and coaxially mounted on the first end 12A of the input shaft 12. An output shaft 22 having a first end 22A and a second end 22B is used. An output sun gear 24 is secured to the first end 22A of the output shaft 22. An axial bore 20 is formed in the first end 22A of the output shaft to coaxially receive therein the second end 12B of the input shaft 12. This end-to-end arrangement of the input shaft and output shaft enables independent axial rotation of the output shaft 22 and the input shaft 12. A reverse rotation control shaft 16 is rotatably and coaxially mounted on the output shaft 22. The control shaft 16 further includes a reverse rotation sun gear 18 secured thereto. A low speed control shaft 30 having a first 30A end and a second 30B end is used. A first carrier 32 is formed at the first end 30A of the shaft 30. The low speed control shaft is rotatably and coaxially mounted on the medium speed control shaft 26. A second carrier 34 is rotatably and coaxially mounted on the reverse rotation control shaft 16 to enable independent rotation about the shaft 16. A plurality of locking pins 36, 52 is used with each locking pin 36A, 52A of the plurality of locking pins 36, 52 secured to and interlinking the first and the second carriers 32, 34 to enable simultaneous rotation of the carriers 32, 34. A plurality of input differential gears 38 is used with each input differential gear 38A being in mechanical communication with the input sun gear 14. A plurality of reverse rotation differential gears 46 is used with each reverse rotation differential gear 46A being in mechanical communication with the reverse rotation sun gear 18. A plurality of output differential gears 42 is used. Each output differential gear 42A is interconnected to an input differential gear 38A of the plurality of input differential gears 42 and is further interconnected to a reverse rotation differential gear 46A of the plurality of reverse rotation differential gears 46. The resulting interconnected output differential 42A, input differential 38A and reverse rotation differential 46A gears are rotatably mounted on a locking pin 36A of the plurality of locking pins 36 to enable simultaneous rotation about locking pin 36A. Each output differential gear 42A is in mechanical communication with the output sun gear 24. A plurality of medium speed differential gears 58' is used with each medium speed differential gear 58A' rotatably mounted on a locking pin 52A of the plurality of locking pins 52. Each medium speed differential gear 58A' is in mechanical communication with the medium speed sun gear 28 and one of the plurality of input differential gears 38. A low speed brake means 62 is used for applying rotational braking force to the low speed control shaft 30 in order to provide low speed rotation of the output shaft 22. A medium speed brake means 64 is used for applying rotational braking force to the medium speed control shaft 26 in order to provide medium speed rotation of the output shaft 22. An interlocking means 70 is used for coupling rotation of the input shaft 12 to the medium speed control shaft 26 in order to produce an increase in rotation of the output shaft upon partial interlocking and to provide high speed rotation of the output shaft upon complete interlocking such that the input shaft and the medium speed control shaft rotate at the same speed. A reverse rotation brake means 66 is used for applying rotational braking force to the reverse rotation control shaft 16 to provide reverse rotation of the output shaft 22.

In the third embodiment of the present invention, the automatic variable speed transmission, comprises an input shaft 112 with a first end 112A and a second end 112B for receiving rotational input. An input sun gear 114 is secured to the input shaft 112 between the first end 112A and the second end 112B of the input shaft. A low speed control shaft 120 is used having a first end 120A and a second end 120B with a low speed sun gear 122 secured to the first end 120A of the shaft 120. The shaft 120 is rotatably and coaxially mounted on the first end 112A of the input shaft. A reverse rotation control shaft 130 is rotatably and coaxially mounted on the low speed control shaft 120. The shaft 130 further includes a reverse rotation sun gear 132 secured thereto to enable simultaneous rotation with the reverse rotation control shaft 130. An output shaft 138 is used having a first end 138A and a second end 138B. An output sun gear 140 is secured to the first end 138A of the output shaft 138 and an axial bore 136 is formed in the first end of the output shaft to coaxially receive therein the second end 112B of the input shaft 112 to enable independent axial rotation of the output shaft 138 and the input shaft 112. A first carrier 142 is rotatably and coaxially mounted on the reverse control shaft 130. A second carrier 144 is rotatably and coaxially mounted on the output shaft 138. A plurality of locking pins 146, 148 is used with each locking pin 146A, 148A of the plurality of locking pins 146,148 secured to and interlinking the first and the second carriers 142, 144 to enable simultaneous rotation of the carriers 142, 144. A plurality of input differential gears 150 is used with each input differential gear 150A rotatably mounted on a locking pin 146A of the plurality of locking pins 146 and each input differential gear 150A is in mechanical communication with the input sun gear 114. A plurality of output differential gears 158 is used with each output differential gear 158A being in mechanical communication with the output sun gear 140. A plurality of reverse rotation differential gears 160 is used with each reverse rotation differential gear 160A being in mechanical communication with the reverse rotation sun gear 132. A plurality of reverse rotation differential gears 154 is used with each low speed differential gear 154A interconnected to a reverse rotation differential gear 160A of the plurality of reverse rotation differential gears 160 and further interconnected to an output differential gear 158A of the output differential gears 158. The interconnected low speed differential 154A, reverse rotation differential 160A and output differential 158A gears are rotatably mounted on each locking pin 148A to enable simultaneous rotation about locking pin 148A. Each low speed differential gear 154A is in mechanical communication with the input sun gear 122 and one of the plurality of input differential gears 150. A low speed brake means 162 is used for applying rotational braking force to the low speed control shaft 120 in order to provide a low speed rotation of the output shaft. An interlocking means 170 is used for coupling the input shaft 112 to the low speed control shaft 120 in order to provide increased rotation of the output shaft upon partial coupling and to provide high speed rotation of the output shaft upon complete coupling of the shafts such that the input shaft and the low speed control shaft 120 rotate at the same speed. A reverse rotation brake means 164 is used for applying rotational braking force to the reverse rotation control shaft 130 in order to provide reverse rotation of the output shaft.

For each of the above described embodiments, the preferred embodiments are described below.

The low speed brake means is preferably a one-way clutch. The interlocking means may be a fluid clutch, a torque converter or an electronic clutch.

The low speed differential gear, the output differential gear and the reverse rotation differential gear are preferably formed as an integral unit.

The input differential gear, the output differential gear and the reverse rotation differential gear preferably have different numbers of teeth relative to each other for better operation.

The output differential gear and the reverse rotation differential gear each include a number of teeth and with the number of teeth of the reverse rotation differential gear being preferably smaller than the number of teeth of the output differential gear and with the output sun gear and the reverse rotation sun gear each include a number of teeth with the number of teeth of the output sun gear being preferably smaller than those of the reverse rotation sun gear.

In the fourth embodiment of the present invention, the automatic variable speed transmission, comprises an input shaft 112 with a first end 112A and a second end 112B for receiving rotational input. An input sun gear 114 is also secured to the shaft 112 between the first end 112A and the second end 112B of the input shaft. A low speed control shaft 120 is used having a first end 120A and a second end 120B with a low speed sun gear 122 secured to the first end 120A of the shaft 120. The shaft 120 is rotatably and coaxially mounted on the first end 112A of the input shaft. An output shaft 138 is used having a first end 138A and a second end 138B. An output sun gear 140 is secured to the first end 138A of the output shaft 138. An axial bore 136 is formed into the first end of the output shaft to coaxially receive therein the second end 112B of the input shaft 112 to enable independent axial rotation of the output shaft 138 and the input shaft 112. A first carrier 142 is rotatably and coaxially mounted on the low speed control shaft 120. A second carrier 144 is rotatably and coaxially mounted on the output shaft 138. A plurality of locking pins 146, 148 is used with each locking pin 146A, 148A of the plurality of locking pins 146, 148 securing and interlinking the first and the second carriers 142, 144 together to enable simultaneous rotation of the carriers 142, 144. A plurality of input differential gears 150 is used with each input differential gear 150A rotatably mounted on a locking pin 146A of the plurality of locking pins 146. Each input differential gear 150A is in mechanical communication with the input sun gear 114. A plurality of low speed differential gears 154 is used with each low speed differential gear 154A being in mechanical communication with each input differential gear 150A and the low speed sun gear 122. A plurality of output differential gears 158 is used with each output differential gear 158A interconnected to a low speed differential gear 154A of the plurality of low speed differential gears 154. The interconnected output differential 158A and low speed differential 154A gears are rotatably mounted on each locking pin 148A. Each output differential gear is in mechanical communication with the output sun gear 140. A reverse rotation ring gear 230 is in mechanical communication with the input differential gear 150A. A low speed brake means 162 is used for applying rotational braking force to the low speed control shaft 120 in order to provide low speed rotation of the output shaft. An interlocking means 170 is used for coupling the input shaft 112 to the low speed control shaft 120 in order to provide increased rotation of the output shaft upon partial coupling of the shafts 112, 120 and to provide medium and high rotational speed of the output shaft. A reverse rotation brake means 264 is used for applying rotational braking force to the reverse rotation ring gear 230 in order to provide reverse rotation of the output shaft 138.

The interlocking means 170 may be selected from a fluid clutch, a torque converter and an electronic clutch.

The interconnected output differential 158A and low speed differential 154A gears are preferably formed in an integral unit.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a perspective view of the first embodiment of the present invention;

FIG. 2 is a sectional view of the first embodiment of the present invention;

FIG. 3 is a sectional view showing the continuous automatic transmission according to the present invention in the neutral state;

FIG. 4 is a sectional view showing the continuous automatic transmission according to the present invention in the low speed state;

FIG. 5 is a sectional view showing the continuous automatic transmission according to the present invention in the medium speed state;

FIG. 6 is a sectional view showing the continuous automatic transmission according to the present invention in the high speed state;

FIG. 7 is a sectional view showing the continuous automatic transmission according to the present invention in the reverse driving state;

FIG. 9 is a perspective view of the third embodiment of the present invention;

FIG. 10 is a sectional view of the third embodiment according to the present invention;

FIG. 11 is a sectional view of the third embodiment of the present invention in the neutral state;

FIG. 12 is a sectional view of the third embodiment of the present invention in the forward low speed state;

FIG. 13 is a sectional view of the third embodiment of the present invention in the high speed state;

FIG. 14 is a sectional view of the third embodiment of the present invention in the reverse driving state.

Similar reference characters refer to similar parts throughout the several views of the drawings.

DETAILED DESCRIPTION OF THE INVENTION

Figure 1:
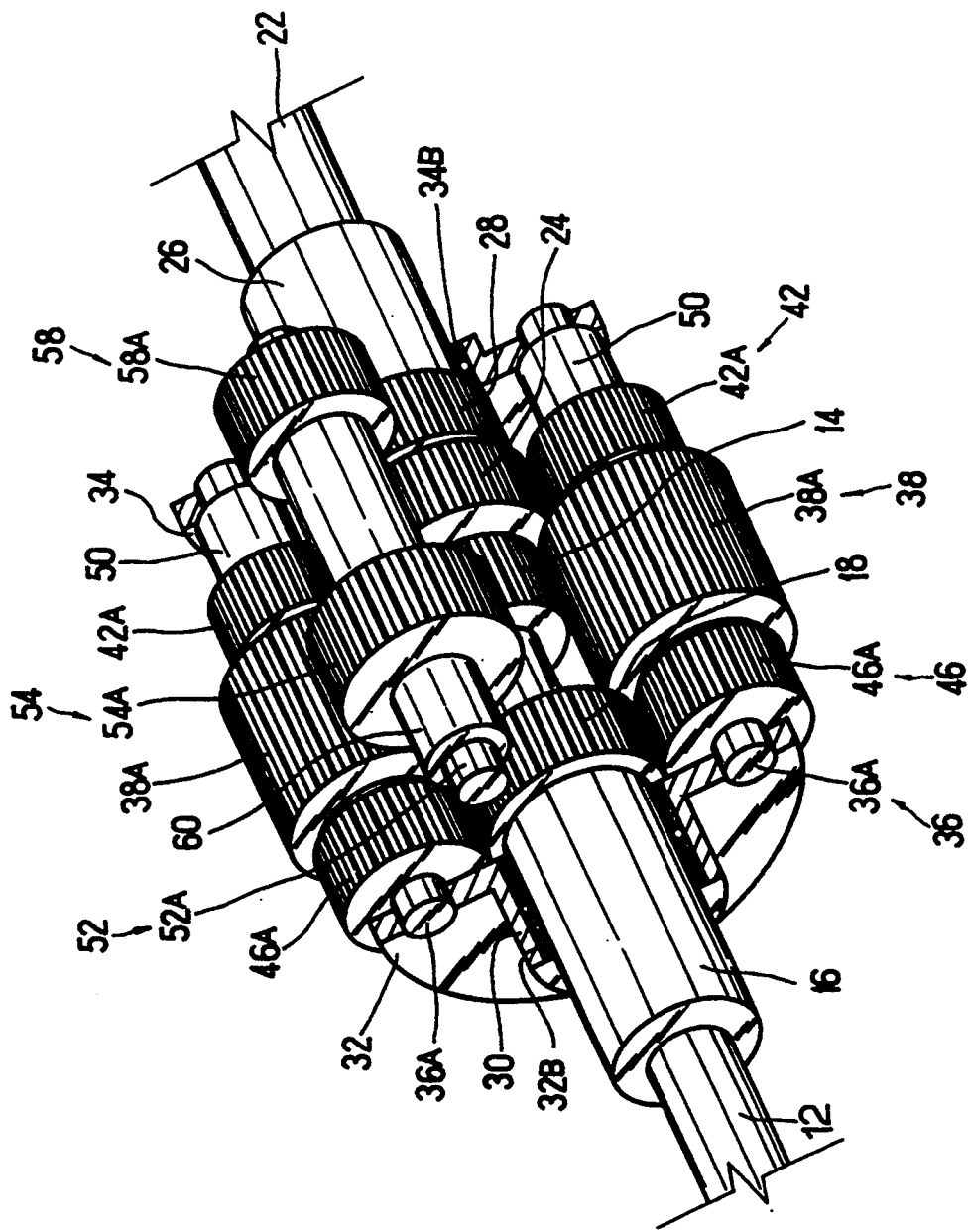
FIGS. 1–7 illustrate the first embodiment of the continuous automatic transmission according to the present invention.
Figure 2:
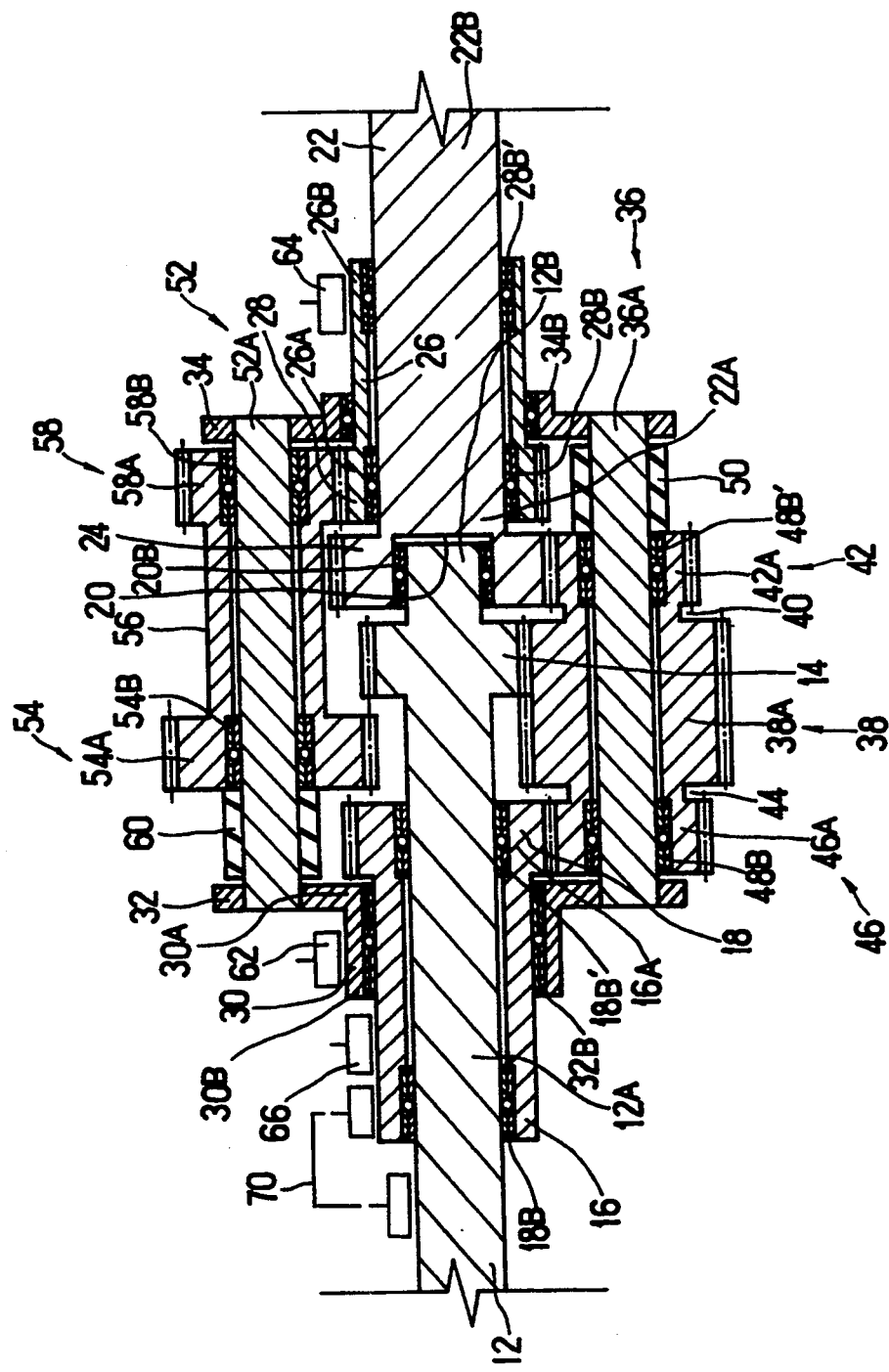

The continuous automatic transmission 10 of the first embodiment of the present invention, as shown in FIG. 1 and FIG. 2, includes an input shaft 12 to which rotational driving force is input from the drive shaft of an engine. The input shaft 12 consists of a first end 12A and a second end 12B. An input sun gear 14 is integrally formed with the input shaft 12 between the first end 12A and the second end 12B. A reverse rotation control shaft 16 of predetermined length is rotatably and coaxially installed at the first end 12A of the input shaft 12. A reverse rotation sun gear 18 is integrally formed at end 16A of the reverse rotation control shaft 16. Bearings 18B, 18B' are installed such that the input shaft 12 and the reverse rotation control shaft 16 rotate independently.

An output shaft has a first end 22A and a second end 22B. A bore 20 is formed into the first end 22A of the output shaft 22 such that the second end 12B of the input shaft 12 is axially received into said bore and rotates independently via a bearing 20B. An output sun gear 24 is integrally formed at the first end 22A of the output shaft 22. A medium speed control shaft 26, having a first end 26A and a second end 26B, of predetermined length is rotatably and coaxially installed on the output shaft 22. A medium speed sun gear 28 is integrally formed at the first end 26A of the medium speed control shaft 26. Bearings 28B, 28B' are installed such that the output shaft 22 and the medium speed control shaft 26 rotate independently.

A low speed control shaft 30 having a first 30A and a second end 30B is coaxially installed on the reverse rotation control shaft 16 near the reverse rotation sun gear 18. A disk shaped first carrier 32 is integrally formed at the first end 30A of the low speed control shaft 30. Bearing 32B is installed such that the low speed control shaft 30 and the first carrier 32 rotate independently about the reverse rotation control shaft 16. A disk shaped second carrier 34 is installed on the medium speed control shaft 26 near the medium speed sun gear 28 so as to rotate freely via a bearing 34B. A plurality of locking pins 36, 52 interconnect and are secured to each of the first and second carriers 32, 34 so that the carriers 32, 34 rotate together, as see FIGS. 1 and 2.

The input differential gear 38A, the output differential gear 42A and the reverse rotation differential gear 46A are integrally formed together but are spaced apart (notches 40 and 44) and have a different diameter. This composite of the differential gears 38A, 42A, 46A is rotatably mounted onto each locking pin 36A so as to rotate freely via bearings 48B, 48B'. The rear half of the input differential gear 38A meshes with the input sun gear 14, the output differential gear 42A meshes the output sun gear 24A, and the reverse rotation differential gear 46A meshes with the reverse rotation sun gear 18. Bushing 50 maybe inserted at the rear side of the output differential gear 42A to prevent the axial movement of the composite differential gears 38A, 42A, 46A along the locking pin 36A.

In like manner the transmission differential gear 54A and the medium speed differential gear 58A are integrally formed and spaced apart (notch 56) with each gear having a particular size. This composite of the differential gears 54A, 58A is rotatably mounted onto each locking pin 52A so as to rotate freely via bearings 54B, 58B. The transmission differential gear 54A meshes with the forward half of the input differential gear 38A, and the medium speed differential gear 58A meshes with the medium speed sun gear 28. Bushing 60 may be inserted at the forward side of the transmission differential gear 54A to prevent the axial movement of the composite differential gears 54A, 58A along the locking pin 52A.

Two "first" sets are used for safety rotating the structure with a set consisting of a locking pin 36A, composite differential gears 38A, 42A, 46A and bushing 50. In like manner, two "second" sets are used for safety rotating the structure with a set consisting of a locking pin 52A, composite differential gears 54A, 58A and bushing 60. However, the number of such sets is not limited.

To perform an output shaft speed change for each step, the brake means for applying the braking force and the interlocking means which can not only rotate the input shaft 12 and the reverse rotation control shaft 16 integrally, but also can give a difference in the revolutions between them are used.

First, the low speed brake means 62 with a one-way clutch is installed on the low speed control shaft 30 to adjust the first carrier 32 in the low speed state. A medium speed brake means 64 is installed on the medium speed control shaft 26 to adjust the medium speed sun gear 28 in the medium speed state. For the high speed driving, an interlocking means 70 is installed which can rotate the input shaft 12 and the reverse rotation control shaft 16 integrally. A reverse rotation brake means 66 is installed on the reverse rotation control shaft 16 to adjust the reverse rotation sun gear 18 in the reverse driving state.

Although the brake means as illustrated are installed on each control shaft, the positions for installation of the brake means and the constructions thereof can be changed. Furthermore, the above described low speed, medium speed and reverse rotation brake means can use automatic control or manual control, and electric/electronic, hydraulic or rotational resistance, etc. In the present application the method in which the low speed control shaft 30 at the time of low speed, the medium speed control shaft 26 at the time of medium speed and the reverse rotation control shaft 16 at the time of reverse driving are braked is by a forcing a brake lining against the respective shafts. This is a rather simple brake method, however, the invention is not limited thereto.

To remove the inconvenience in which, after applying the rotational or brake force, the brake force should again be released when changing speed and to prevent the reverse rotation of the low speed control shaft 30, that is, to enable one-way rotation, a one-way clutch is used in low speed brake means 62.

For high speed driving, an interlocking means 70 is used which permits rotational difference between the input shaft 12 and the reverse rotation control shaft 16 and/or can rotate them integrally. Such means are known devices such as a hydraulic clutch, torque converter, electric/electronic clutch. For sake of brevity, a detailed description about such known devices is omitted.

A description of the power transmission procedure and speed variation conditions of the continuous automatic transmission according to the present invention is set forth below with the speed variation conditions classified into a neutral, low speed, medium speed, high speed and reverse driving states.

The continuously variable transmission of the present invention may be used with any rotational power means and in any mechanism which requires that the power output be varied to accommodate varying loads. Thus, the present invention may be used in combination with automobiles and industrial machines, etc. For purposes of illustration, the continuously variable transmission of the present invention is described in combination with an automobile.

In the automobile the rotational force is transmitted from the driving shaft of the engine to the input shaft 11 of the present invention. Here the input speed is converted to low, medium, medium-high or high speed and transmitted to the output shaft 22.

For the convenience of explanation, the direction of the input shaft when viewed from the left side of the drawings is counter-clockwise, and such a direction is defined as direction " ↑ " in the drawings.

1. Neutral State (FIG. 3): Output shaft (22) stops

Input shaft 12 ↑ - Input sun gear 14 ↑ - Input differential gears 38 ↓
—Output differential gears 42 ↓ -- Output sun gear 24 stops -- Carriers 32, 34 ↓ (idling)
—Reverse rotation differential gears 46 ↓ . . . . . . Reverse rotation sun gear 18 ↑ (idling)
—Transmission differential gears 54 ↑ - Medium speed differential gears 58 ↑ - Medium speed sun gear 28 ↓ (idling)

Figure 3:
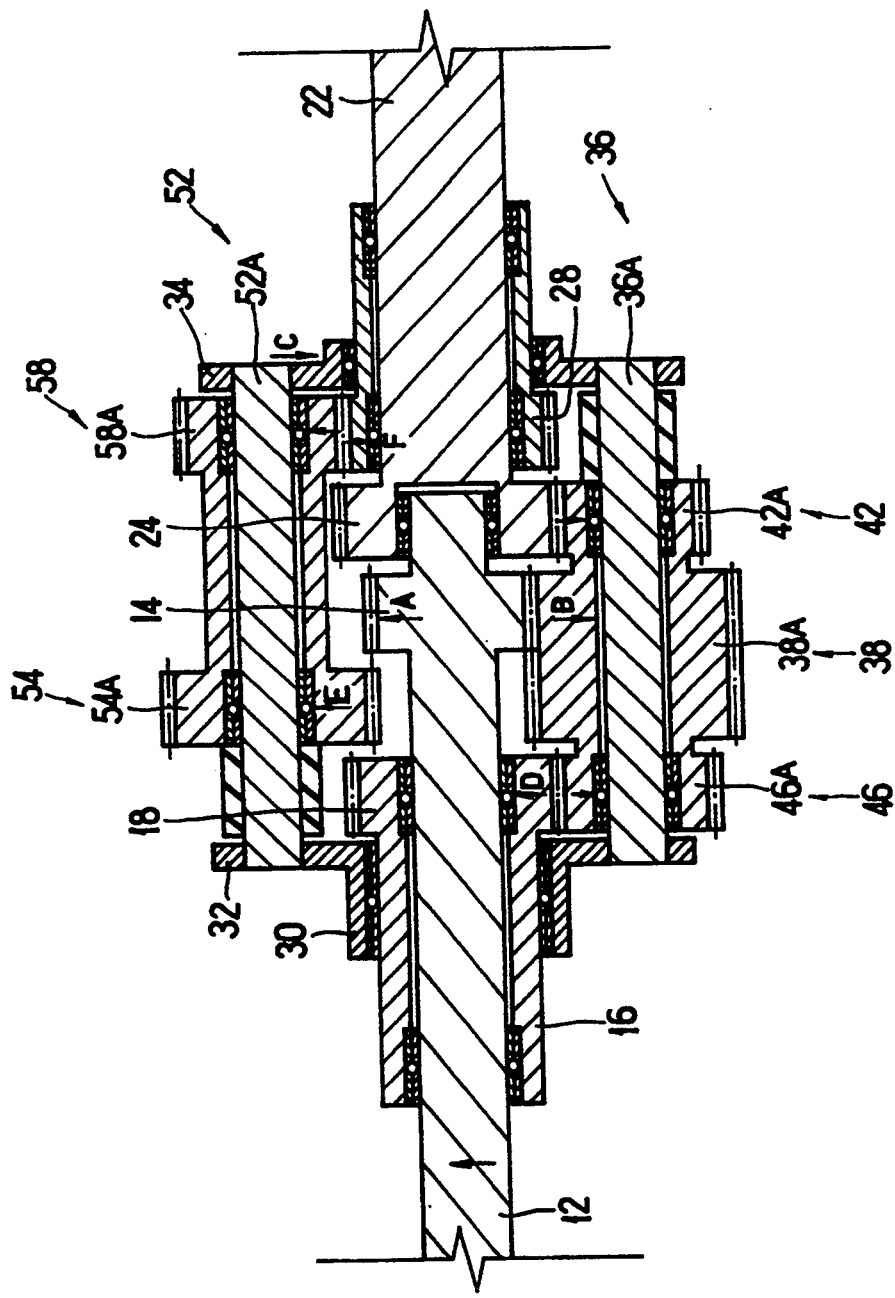

The neutral state is a state in which the driving force of the engine is not output to the output shaft 22 and the transmission idles as shown in FIG. 3. That is, if the rotational force from the driving shaft of the engine is input in the state in which a load is applied on the output shaft 22, then the input shaft 12 rotates and the input sun gear 14 integrally formed on the input shaft 12 rotates in direction A. The input differential gear 38A meshed with the input sun gear 14 rotates about the locking pin 36A in a direction B opposite to the rotational direction of the input sun gear 14. The output differential gear 42A and the reverse rotation differential gear 46A which are integrally formed with the input differential gear 38A rotate about the locking pin 36A in the direction B same as that of the input differential gear 38A.

However, because the output sun gear 24 meshed with the output differential gear 42A is stationary due to the load, the output differential gear 42A revolves around the output sun gear 24 while at the same time, rotating about its respective axis, and therefore carriers 32, 34 rotate in a direction C opposite to the rotational direction of the input sun gear 14.

At the same time, the reverse rotation differential gear 46A integrally formed with the output differential gear 42A makes the reverse rotation sun gear 18 rotate in a direction D same as that of the input sun gear 14, because the rotation of the reverse rotation differential gear 46A about its own axis exercises greater effect upon the reverse rotation sun gear 18 than the co-rotation of the gear 46A with the carriers 32, 34.

The transmission differential gear 54A meshed with the forward half of the input differential gear 38A rotates about the locking pin 52A in a direction E same as that of the input sun gear 14. Therefore, the medium speed differential gear 58A, integrally formed with the transmission differential gear 54A, rotates about locking pin 52A in the direction E and makes the medium speed sun gear 28 rotate in the direction F opposite to that of the input sun gear 14.

Here, all the differential gears 38A, 42A, 46A, 54A, 58A co-rotate with the carriers 32, 34 while at the same time rotating about each own axis.

Because the output shaft 22 is stationary due to the load, the rotational force through the input shaft 12 is not transmitted to the output shaft and makes the carriers 32, 34, the reverse rotation sun gear 18 and the medium speed sun gear 28 idle.

Figure 4:
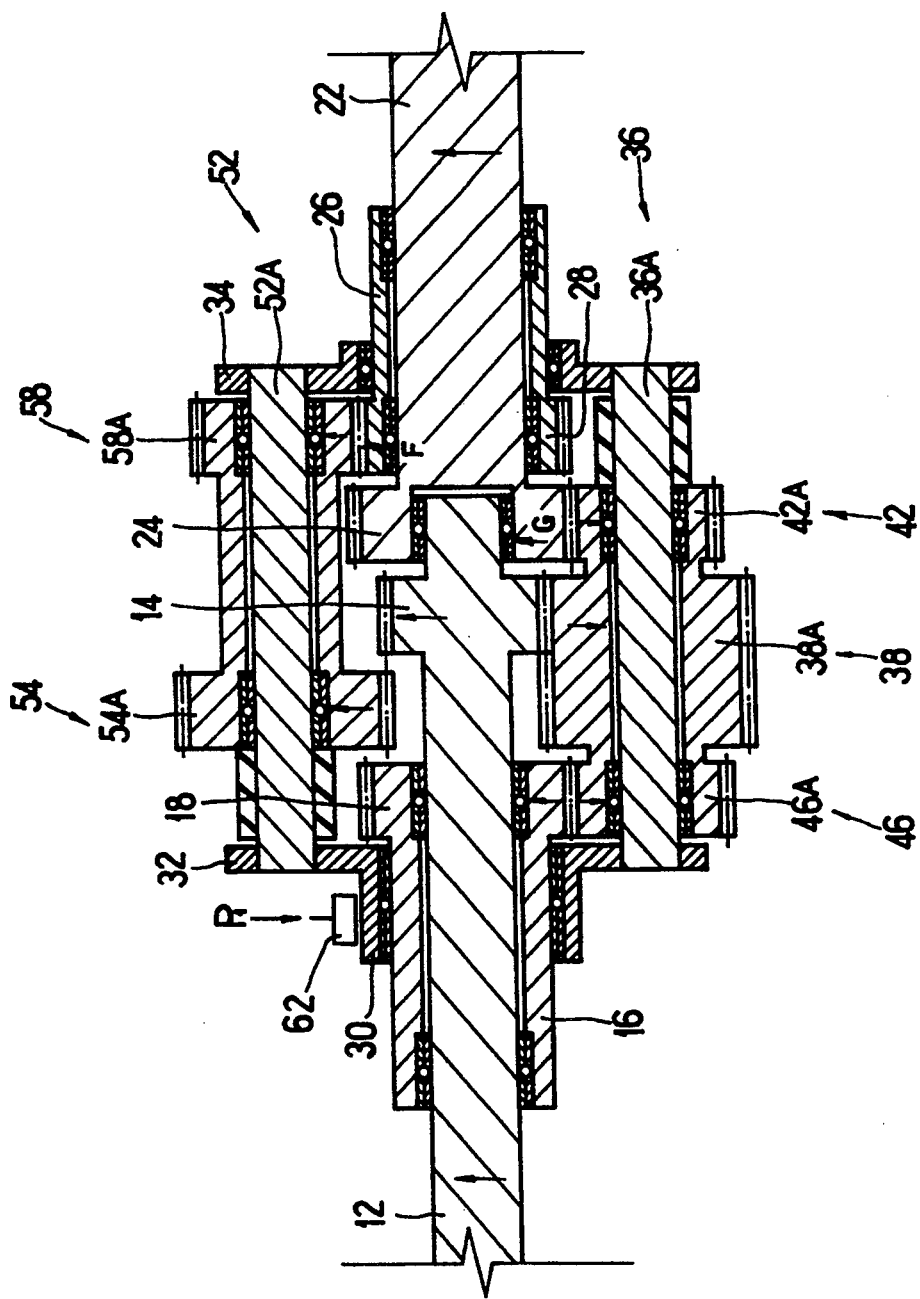

2. Low speed state (FIG. 4): Carriers 32, 34 and low speed control shaft 30 stop Input shaft 12 ↑ —input sun gear 14 ↑ —Input differential gears 38 ↑ —Output differential gears 42 ↑ —Output sun gear 24 ↑ —Output shaft 22 ↑

The low speed state is a state in which the rotation of the output shaft 22 is gradually increased from the neutral state. When the brake force P1 is applied by the low speed brake means 62 with a one-way clutch which is installed on the low speed control shaft 30 to adjust the rotation of the carriers 32, 34 as described above, the rotation of the carriers 32, 34, which were rotating in the direction C opposite to the rotation of the input shaft 12 in the neutral state, decreases and eventually stops. The rotation of the output shaft 22 increases gradually in proportion to the decreasing of the rotation of carriers 32, 34. That is, the co-rotation of the input differential gear 38A and the output differential gear 42A with the carriers decreases and eventually stops in the proportion to the decreasing of the rotation of the carriers 32, 34 due to the brake force P1, and at the time, the differential gears rotate only about their respective axis.

Consequently, the output sun gear 24 meshed with the output differential gear 42A rotates in a direction G same as that of the input shaft 12 by the rotational force of the output differential gear 42A about its own axis and also the output shaft 22 integrally formed with the output sun gear 24 rotates in the same direction G.

Comparing the rotational direction of each gear during the low speed state with that of the neutral state, the carriers 32, 34 which was rotating in the direction C opposite to that of the input shaft 12 come to stop, the output sun gear 24 which was stationary rotates in the direction G, each differential gear 38A, 42A, 46A, 54A, 58A eventually does not co-rotate with the carriers and rotates only about its own axis in the same direction as that of neutral state, and also each sun gear 18, 28 rotates in the same direction as in the neutral state.

Figure 5:
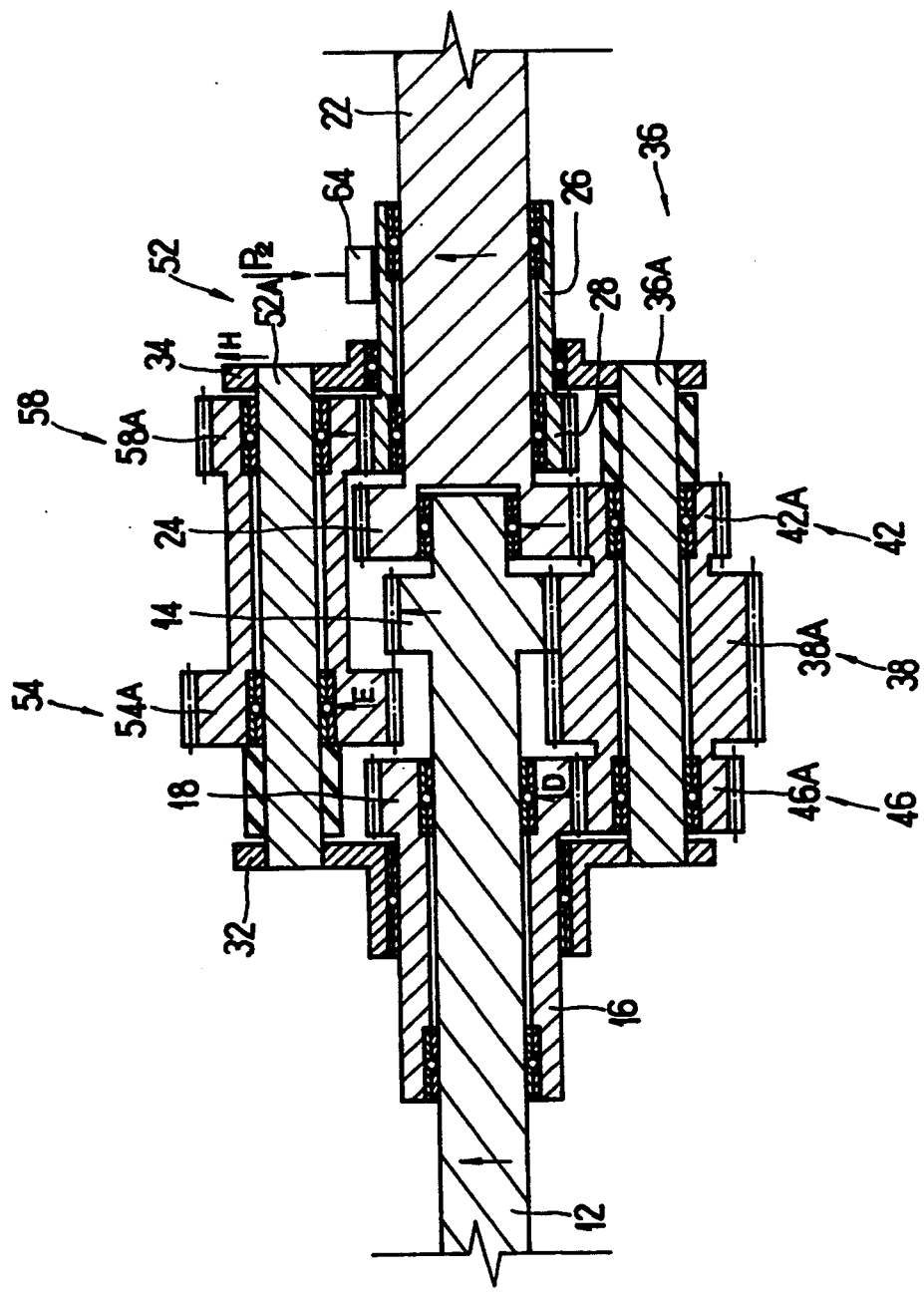

3. Medium speed state (FIG. 5): Medium speed control shaft 26 stops

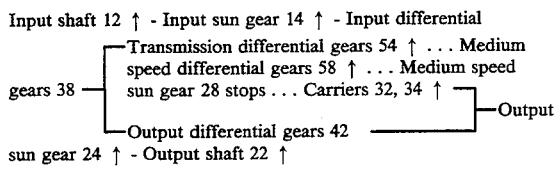

The medium speed state increases the rotation of the output shaft 22 above the rotational speed of the low speed state. If a brake force P2 is applied by the medium speed brake means 64 installed on the medium speed control shaft 26, the rotation of the medium speed sun gear 28, integrally formed on the medium speed control shaft 26 which was rotating in the direction F opposite to that of the input shaft 12, decreases and stops. That is, as the rotation of the medium speed sun gear 28 decreases and stops, the medium speed differential gears 58 meshed with the medium speed sun gear 28 revolves around the medium speed sun gear 28, and therefore the revolving force rotates the carriers 32, 34 which was stationary in the low speed state in a direction H same as that of the input shaft 12. (Of course, the revolving force when the medium speed sun gear 28 stops is the strongest of that during the decreasing of the rotation of the gear 28).

At the same time, the co-rotation of the input differential gear 38A and the output differential gear 42A with the carriers 32, 34 increases. Consequently, the rotation of the output sun gear 24 meshed with the output differential gear 42A in the direction same as that of the input shaft 12 is further increased and also the rotation of the output shaft 22 integrally formed with the output sun gear 24 is increased.

For reference, owing to the increasing co-rotation of the reverse rotation differential gear 46A with the carriers, the reverse rotation differential gear 46A further increases the rotation of the reverse rotation sun gear 18 in the direction same as that of the input shaft.

Reviewing the rotational direction of each gear, the reverse rotation sun gear 18, the carriers 32, 34, the transmission differential gear 54A and the medium speed differential gear 58A rotate in the direction D, H, E, same as that of the input sun gear 14.

Figure 6:
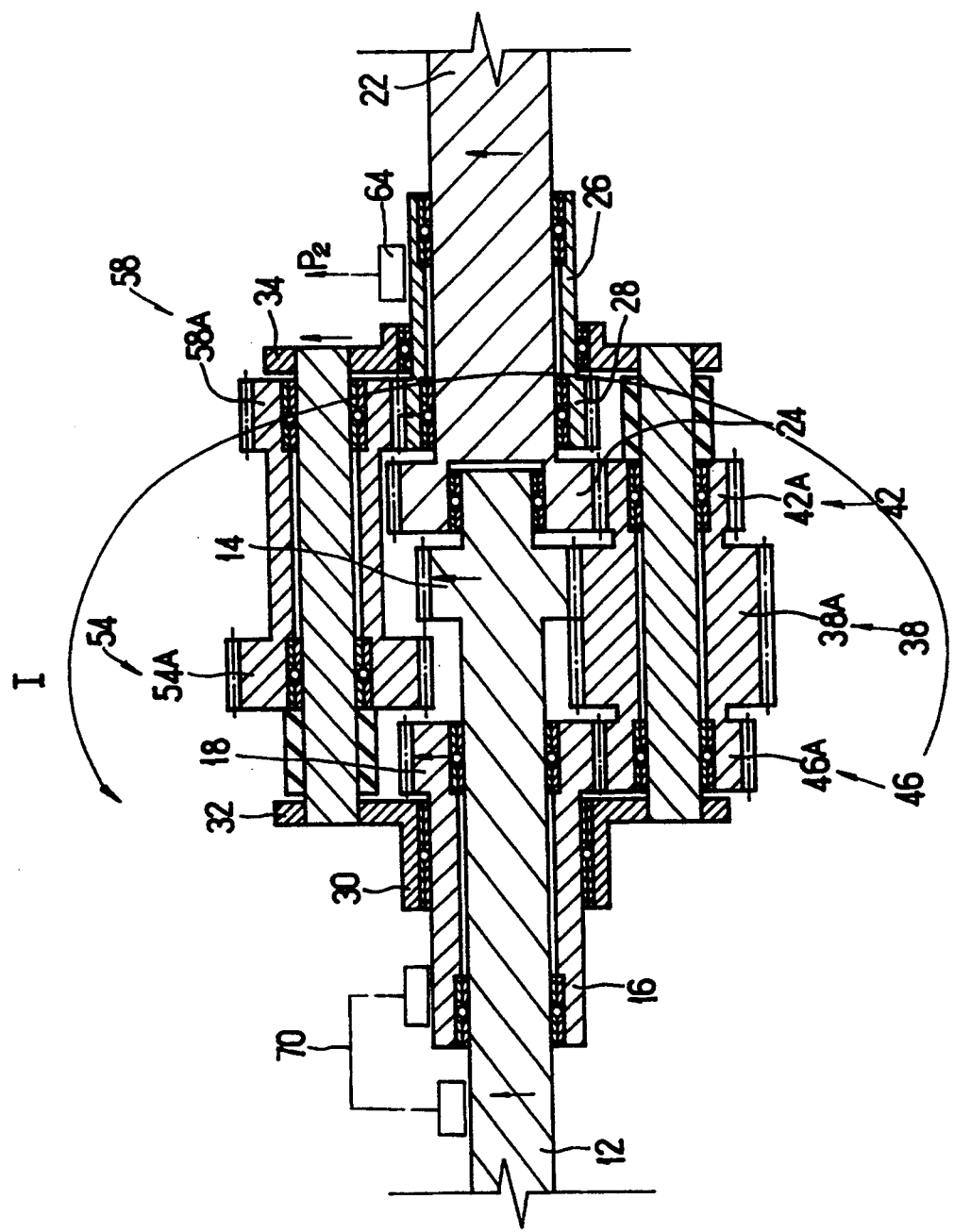

4. High speed state (FIG. 6)

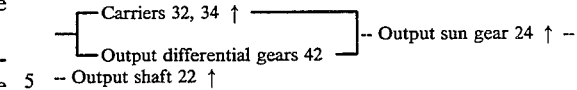

-continued

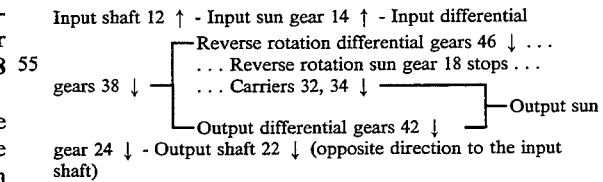

The high speed state is a state used to further accelerate from the medium speed state, the brake force P2 applied to the medium speed control shaft 26 is released and the input shaft 12 and the reverse rotation control shaft 16 are integrally rotated by utilizing the interlocking means 70.

In the high speed state, the rotational force passing through the input shaft 12 is transmitted into two paths. One path is that in which the rotation force is transmitted to the input differential gear 38A by passing through the input shaft 12 and the input sun gear 14. The second path is that in which the rotational force is transmitted to the reverse rotation differential gear 46A by passing through the reverse rotation sun gear 18 according to an integral rotation of the input shaft 12 and the reverse rotation control shaft 16 by using the interlocking means 70.

The rotational forces, after passing through these two paths, join at carriers 32, 34 to rotate the output shaft 22 and the output sun gear 24 meshed with the output differential gear 42A in the same direction as the input shaft 12. That is, since the rotation force input to the input sun gear 14 and the reverse rotation sun gear 18 are the same in their revolutions and direction, they cannot rotate the input differential gear 38A and the reverse rotation differential gear 46A which are meshed with the input sun gear 14 and the reverse rotation sun gear 18 respectively, they also cannot rotate the output differential gear 42A, the transmission differential gear 54A and the medium speed differential gear 58A, but rotate the carriers 32, 34, the output sun gear 24 and the output shaft 22 in the same direction as the input shaft 12.

In this state, all the gears and the carriers 32, 34 together form a rotating body with the two sun gears 14, 18 as the centers to rotate in a direction I.

Here, although the interlocking means 70 is explained to be used by connecting the input shaft 12 and the reverse rotation control shaft 16, it is not limited to that. For example, connecting the reverse rotation control shaft 16 and the low speed control shaft 30 or connecting the medium speed control shaft 26 and the carriers 34 or the output shaft 22 renders the same function.

Figure 7:
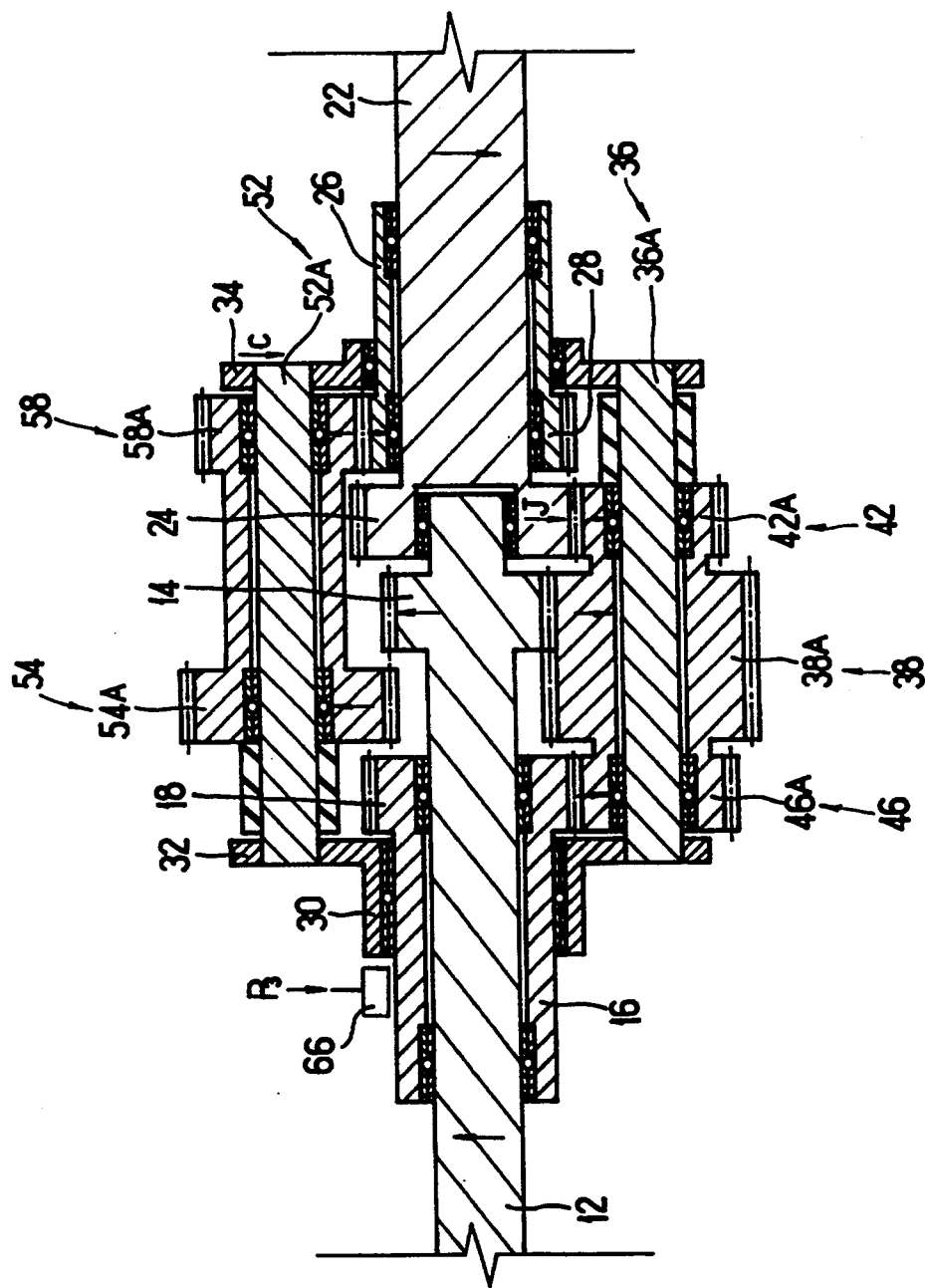

5. Reverse rotation state (FIG. 7): The reverse rotation control shaft 16 stops

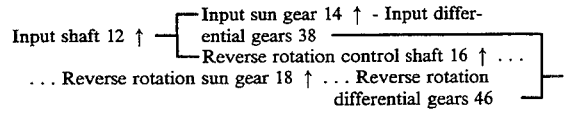

The reverse driving state is a state in which the output shaft 22 rotates in a direction opposite to that of the input sun gear 14. If a brake force P3 is applied by the reverse rotation brake means 66 installed on the reverse rotation control shaft 16 in the above said neutral state, then the reverse rotation sun gear 18 which has been idling in a direction D same as the rotational direction of the input shaft 12 in the neutral state stops and the output shaft 22 rotates in a direction opposite to that of the input sun gear 14.

That is, as the reverse rotation sun gear 18 which has been rotating in a direction D in the neutral state gradually decreases in its rotation and stops due to the brake force P3, the revolving force of the reverse rotation differential gear 46 meshed with the reverse rotation sun gear 18 around the reverse rotation sun gear 18 is increased proportionally, and the increased revolving force further increases the rotation of the carriers 32, 34 which has been rotating in a direction C. (Of course, the revolving force is larger in the stationary condition than when the rotation of the reverse rotation sun gear 18 is decreased).

At the same time, the input differential gear 38A integral with the reverse rotation differential gear 46A rotate and the output differential gear 42A also rotate about their own axes and are proportionally increased in their revolution revolving in the opposite direction to that of the input sun gear 14 together with the carriers 32, 34.

Therefore, as the revolution of the output differential gear 42A revolving together with the carriers is increased, the output sun gear 24 meshed with the output differential gear 42A does not rotate in the same direction as the input shaft 12 but rotates in a direction J opposite to that of the input shaft 12, this being because the influence of the revolving force becomes larger than the influence of the rotational force of the output differential gear 42A. Therefore, as the output sun gear 24 rotates in a direction J, the output shaft 22 integral with the output sun gear 24 also rotates in the same direction J which is opposite to the rotational direction of the input shaft 12.

As a reference, because the influence of the revolving force of the transmission differential gear 54A and the medium speed differential gear 58A becomes relatively larger than that of the rotational force, the rotation of the medium speed sun gear 28 in a direction F is further increased in a direction opposite to the rotational direction of the input shaft 12.

Note that the number of teeth of each gear may be varied, and the reverse rotation state of the present application is based on the case in which the number teeth of the output differential gear 42A is smaller than that of the reverse rotation differential gear 46A and the number of teeth of the output sun gear 24 is larger than that of the reverse rotation sun gear 18, and there can be relative change between the revolving force and the rotation force of each differential gear according to the change in the number of teeth of each gear.

Next, the second embodiment of the present invention is described.

Figure 8:
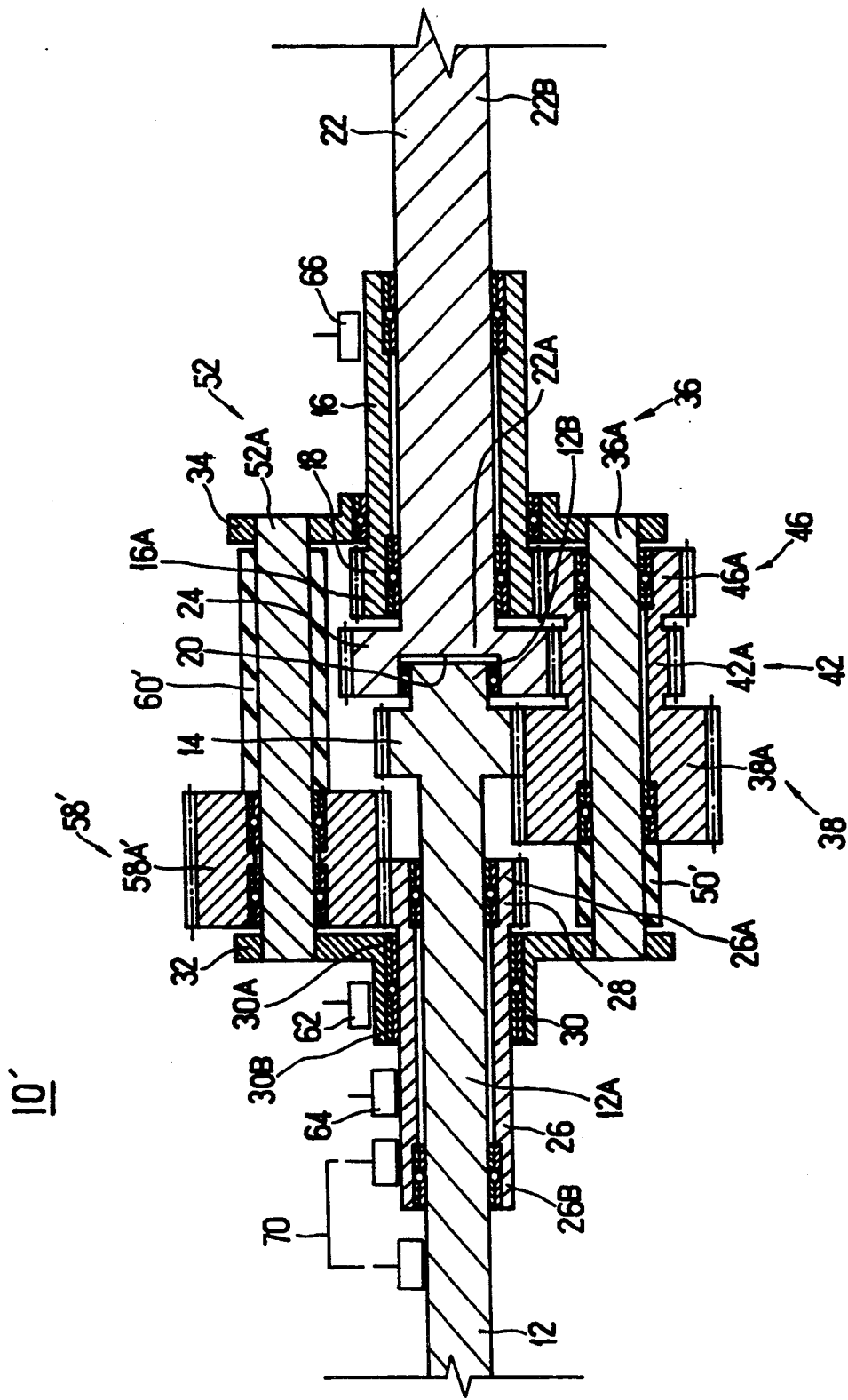
FIG. 8 is a sectional view of the second embodiment of the present invention in which the reverse rotation control shaft and the medium speed control shaft of FIG. 2 are interchanged.

The continuous automatic variable speed transmission 10' of the second embodiment of the present invention is shown in FIG. 8. In this embodiment the positions of the reverse rotation control shaft 16 and the medium speed control shaft 26 are switched from the position in the first embodiment. Therefore, since the actuating method and the function are same as in the first embodiment, a detailed description thereof is omitted and a brief description is given only about the replaced constitution.

That is, the reverse rotation control shaft 16 coaxially mounted on the input shaft 12, the reverse rotation sun gear 18 integral with the reverse rotation control shaft. 16 and the reverse rotation brake means 66 are mounted on the output shaft 22, and the medium speed control shaft 26 coaxially mounted on the output shaft 22, the medium speed sun gear 28 integral with the medium speed control shaft 26 and the medium speed brake means 64 are mounted on the input shaft 12, as compare FIGS. 2 and 8. The reverse rotation differential gear 46 meshed with the reverse rotation sun gear 18 is integrally formed at the rear of the output differential gear 42A, bushing 50' is mounted at the place which was formerly for the reverse rotation differential gear 46A, the medium speed differential gear 58A meshed with the medium speed sun gear 28 is integrally formed in the front of the transmission differential gear 54A in the first embodiment to form a medium speed differential gear 58A', and a bushing 60' is mounted at the place where the medium speed differential gear 58A' and the notch 56 are positioned.

As described above, the constitution can be changed when desired. The operating method and the rotational direction in the medium speed state and the reverse rotation state in the second embodiment are the same as described for the first embodiment. The only differences are that the positions of operation are switched and the interlocking means 70 does not connect the reverse rotation control shaft 16 to the input shaft 12, as in the first embodiment, but rather connects the medium speed control shaft 26 to the input shaft 12, as see FIG. 8.

Next, the description of the third embodiment of the present invention is given.

The third embodiment also has an output sun gear on the output shaft as in the first embodiment.

Figure 9:
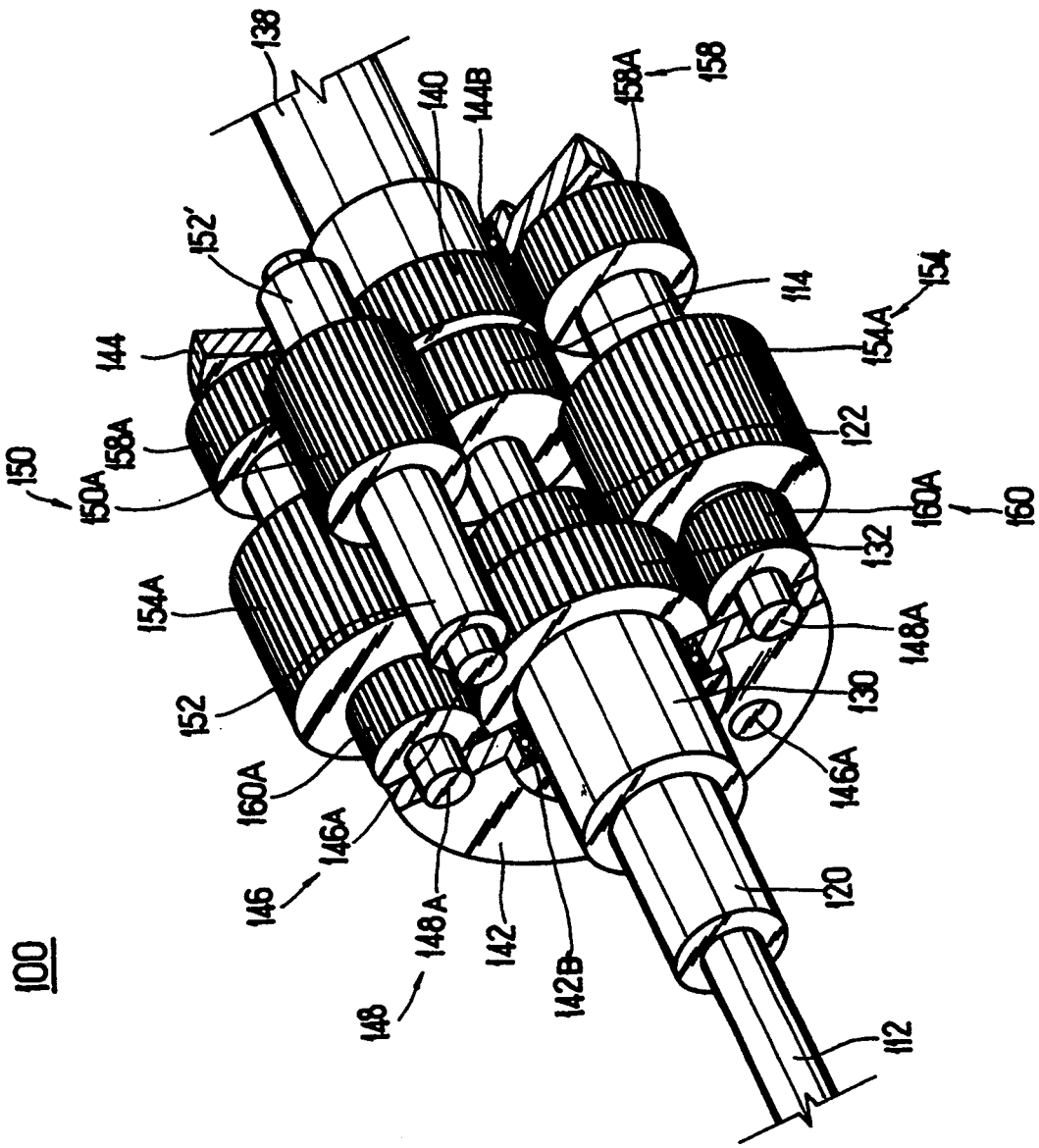
FIGS. 9-14 illustrate the third embodiment of the present invention.
Figure 10:
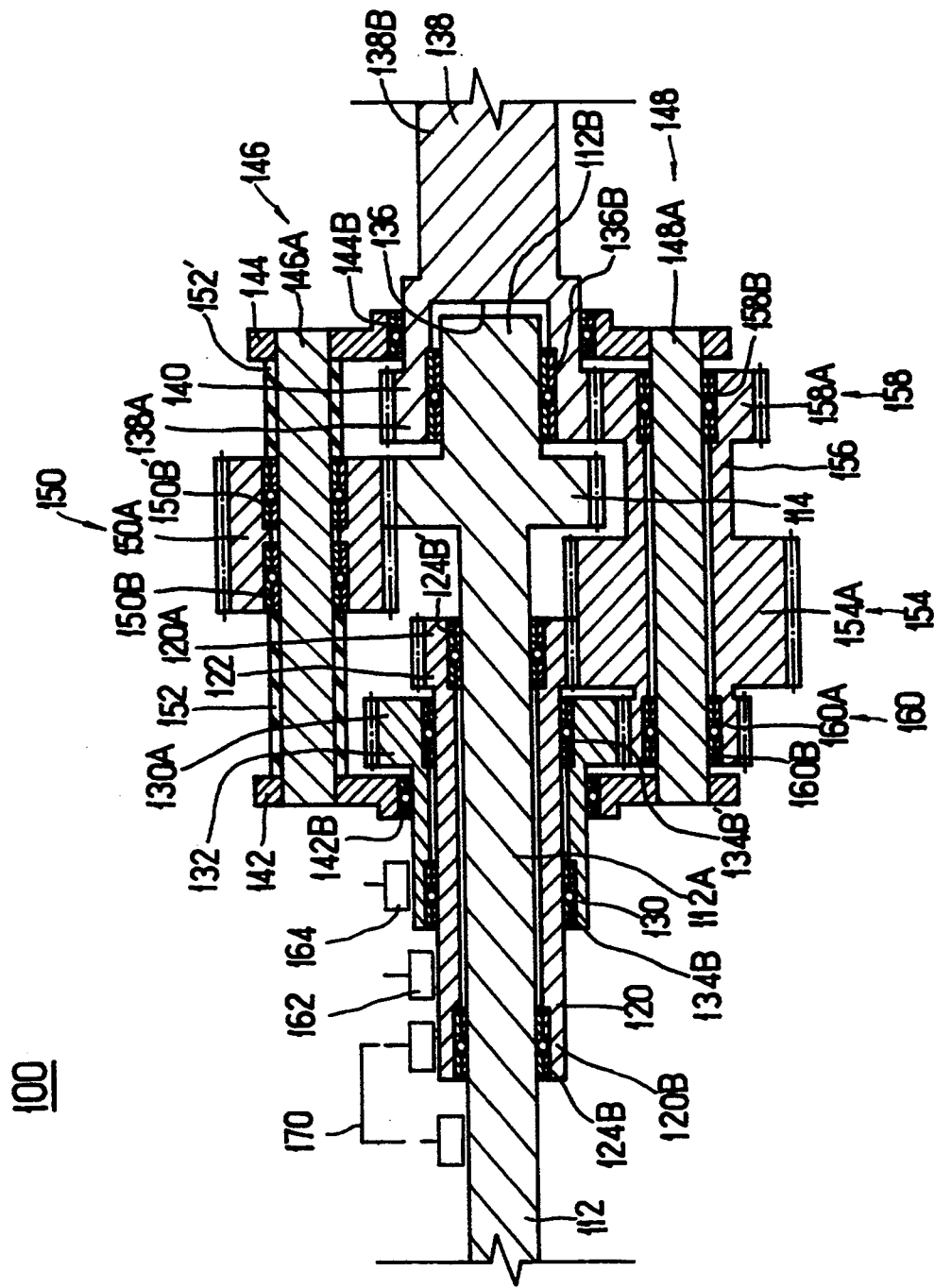

In the continuous automatic variable speed transmission 100 of the third embodiment of the present invention is, as shown in FIGS. 9 and 10, the input shaft 112 receives rotational driving force from the driving shaft of the engine. The input shaft 112 is divided into a first end 112A and a second end 112B, and an input sun gear 114 is secured to the input shaft 112 therebetween. A low speed control shaft 120, of a predetermined length, is spaced from the input sun gear 114 by a required distance and is coaxially mounted on the first end 112A of the input shaft 112. A low speed sun gear 122 is secured to the first end 120A of the low speed control shaft 120. Bearings 124B, 124B' are installed so that the input shaft 112 and the low speed control shaft 120 can rotate independently. A reverse rotation control shaft 130, of a predetermined length, is rotatably and coaxially mounted on the low speed control shaft 120. The reverse rotation sun gear 132 is integrally formed at one end 130A of the reverse rotation control shaft 130. Bearings 134B, 134B' are installed so that the low speed control shaft 120 and the reverse rotation control shaft 130 can rotate independently from each other.

An output shaft 138 has a first end 138A and a second end 138B. An axial bore 136 of a predetermined depth is formed in the first end 138A of the output shaft 138. A bearing 136B is operatively positioned into the bore to facilitate the independent rotation of the respective shafts. The output sun gear 140 is secured to first end 138A of the output shaft 138.

A first carrier 142 is rotatably and coaxially secured on the reverse rotation control shaft 130 near the reverse rotation sun gear 132. A bearing 142B is inserted so that carrier 142 can rotate independently from the rotation of the reverse rotation control shaft 130. A second carrier 144 is rotatably and coaxially secured on the output shaft 138. A bearing 144B is inserted so that the carrier 144 can rotate independently from rotation the output shaft 138.

A plurality of locking pins 146, 148 are used with each locking pin 146A, 148A securing and interlinking the first and second carriers together to ensure simultaneous rotation of the two carriers, as see FIG. 9.

Each input differential gear 150A is rotatably secured to each locking pin 146A via bearings 150B, 150B' to insure independent rotation. The rear part of the input differential gear 150A meshes with the input sun gear 114. To prevent movement of the input differential gear 150A along the locking pin 146A bushings 152 and 152' are used, as see FIG. 10.

A notch 156 is formed between the low speed differential gear 154A and the output differential gear 158A which are integrally formed but have a different size. Notch 156 allows for the clearance of sun gear 114. The reverse rotation differential gear 160A is integrally formed adjacent to the low speed differential gear 154A. The composite differential gears 154A, 158A, 160A is rotatably inserted onto each locking pin 148A via bearings 158B, 160B. The reverse rotation differential gear 160A is mounted near the carrier 142, the output differential gear 158 is mounted near the carrier 144, and the low speed differential gear 154A is mounted so to mesh with the low speed sun gear 122 and the forward part of the input differential gear 150A.

Here, the locking pin 146A, the input differential gear 150A and the bushings 152, 152' form a set, two such sets are used to ensure stability of the rotating body, and likewise, the locking pin 148A, the low speed differential gear 154A, the output differential gear 158A and the reverse rotation differential gear 160A form another set, two such sets are used. However, as appreciated by those skilled in the art, the number of such sets is not limited.

The inner side of each input differential gear 150A meshes with the input sun gear 114, and the forward part of gear 150A meshes with each low speed differential gear 154A. The inner side of the forward part of each low speed differential gear 154A meshes with the low speed sun gear 122. Each output differential gear 158A meshes with the output sun gear 140, and each reverse rotation differential gear 160A meshes with the reverse rotation sun gear 132.

In order to perform speed variation at each stage, the brake means for applying rotational resistance to the involved shafts and the interlocking means 170 for enabling the input shaft and the low speed control shaft to rotate integrally or to have a difference in rotational speed are used.

First, the low speed brake means 162 using a one-way clutch for restricting the rotational direction is mounted on the low speed control shaft 120 to control the low speed sun gear 122 in the forward rotation low speed state, and the interlocking means 170 is used to attain the medium speed and the high speed. The reverse rotation brake means 164 is mounted on the reverse rotation control shaft 130 formed integrally with the reverse rotation sun gear 132 to control the reverse rotation sun gear 132 in the reverse rotation state.

Although the brake means are illustrated as being mounted on a control shaft at a particular position, the position of the installation or the construction can vary as appreciated by one skilled in the art. The one-way clutch is mounted on the low speed brake means 162 to eliminate the inconvenience of releasing the brake force again after applying the brake force at the time of speed variation and to prevent the reverse direction rotation of the low speed control shaft 120.

The interlocking means 170 includes a fluid clutch, a torque converter, an electric / electronic clutch can be used to control the input shaft 112 and the low speed control shaft 120. However, a detailed description about such known devices is omitted here for sake of brevity.

A description of the power transmission procedure and speed variation conditions of the continuous automatic transmission according to the present invention is set forth below with the speed variation conditions classified into a neutral, low speed, medium speed, high speed and reverse driving states.

1. Neutral state (FIG. 11)

Input shaft 112 ↑ - Input sun gear 114 ↑ - Input differential gears 150 ↓ - Low speed differential gears 154 ↑ ─────

⎡─Low speed sun gear 122 ↓ (idling)
├─Output differential gears 158 ↑ -- Carriers 142, 144 ↑ (idling)
⎣─Reverse rotation differential gears 160 ↑ - Reverse rotation sun gear 132 ↑ (idling)

Figure 11:
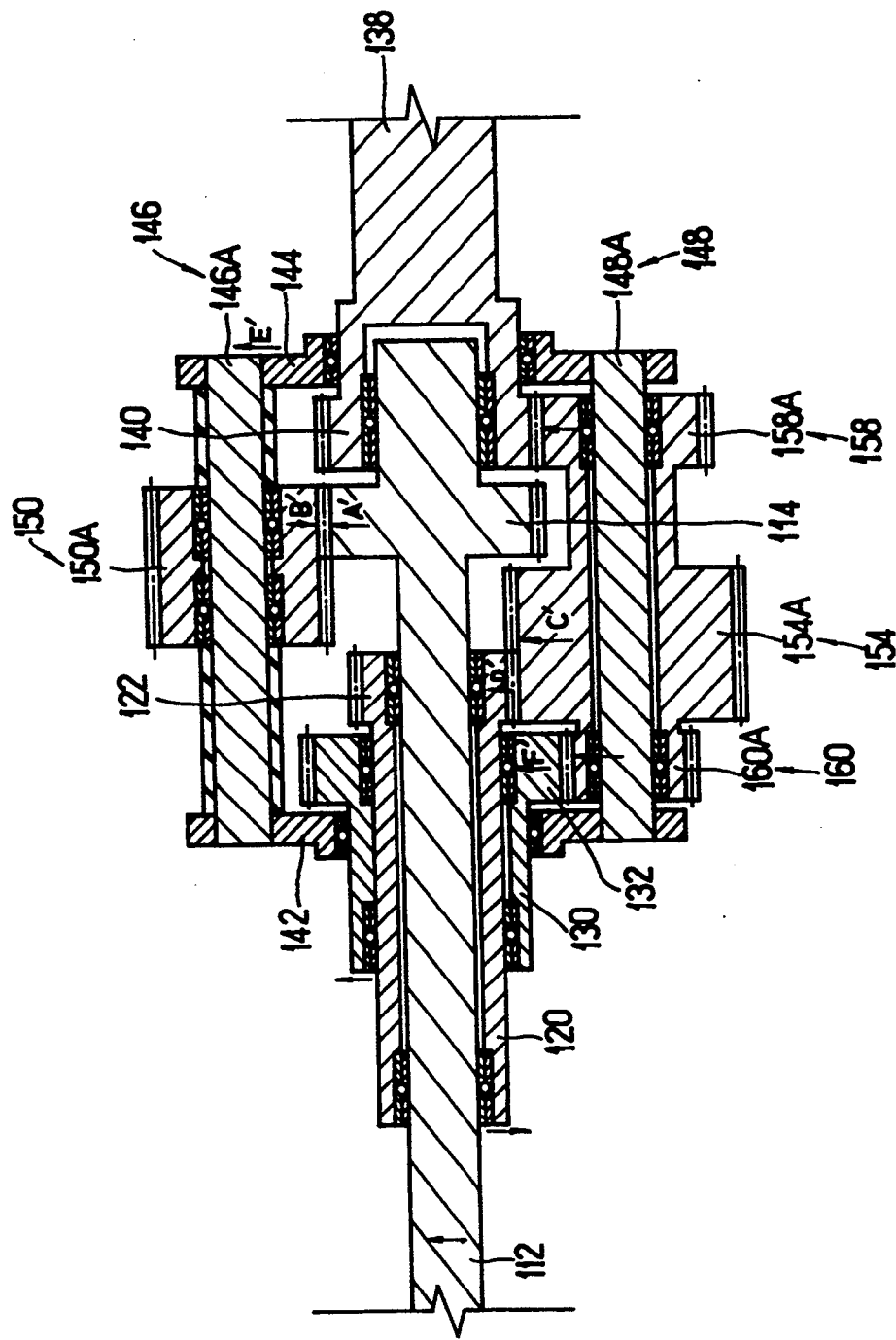

The neutral state is a state in which the driving force of the engine is not output to the output shaft 138, i.e. an idling state as shown in FIG. 11. That is, if the rotation force of the driving shaft of the engine is input when the output shaft 138 is loaded, then the input shaft 112 rotates and the input sun gear 114 integrally formed on the input shaft 112 rotates in same direction A', and according to rotation of the input sun gear 114 the input differential gear 150A meshed with it rotates in a direction B' opposite to the rotational direction of the input sun gear 114 about the locking pin 146A. The low speed differential gear 154A meshes with the input differential gear 150A, the output differential gear 158A integrally formed with the low speed differential gear 154A and the reverse rotation differential gear 160A rotates in a direction C' same as that of the input sun gear 114.

Since the output sun gear 140 which is meshed with the output differential gear 158A is in a stationary condition due to the load, the output differential gear 158A rotates about its own axis and at the same time rotates around, that is, revolves around the output sun gear 140, and therefore the carriers 142, 144 rotate in a direction E' which is the same as that of the input shaft 112. At the same time, the low speed differential gear 154A and the reverse rotation differential gear 160A integrally formed with the output differential gear 158A revolve.

Reviewing the reverse rotation differential gear 160A first, the reverse rotation differential gear 160A tends to rotate the reverse rotation sun gear 132 meshed with it in a direction opposite to that of the input shaft 112. However, since the revolving force of it rotating together with the carriers 142, 144 is larger than the rotational force of the reverse rotation differential gear 160A, it eventually rotates the reverse rotation sun gear 132 in a direction F' which is the same as that of the input shaft 112. Subsequently, the low speed differential gear 154A rotates the low speed sun gear 122 meshed with it in a direction D' opposite to that of the input shaft 112. Although the low speed differential gear 154A revolves together with the carriers 142, 144, since the rotational force of it is larger than the revolving force of it, it rotates the low speed sun gear 122 in a direction D'. Here, the relative magnitudes of the revolving force and the rotational force vary with the number of teeth of the gears which are meshed together.

As described above, the rotational force of the input shaft 112 is not output since the output shaft 138 is stationary due to the load, but makes the low speed sun gear 122, the reverse rotation sun gear 132 and the carriers 142, 144 to idle only, resulting in the neutral state.

Figure 12:
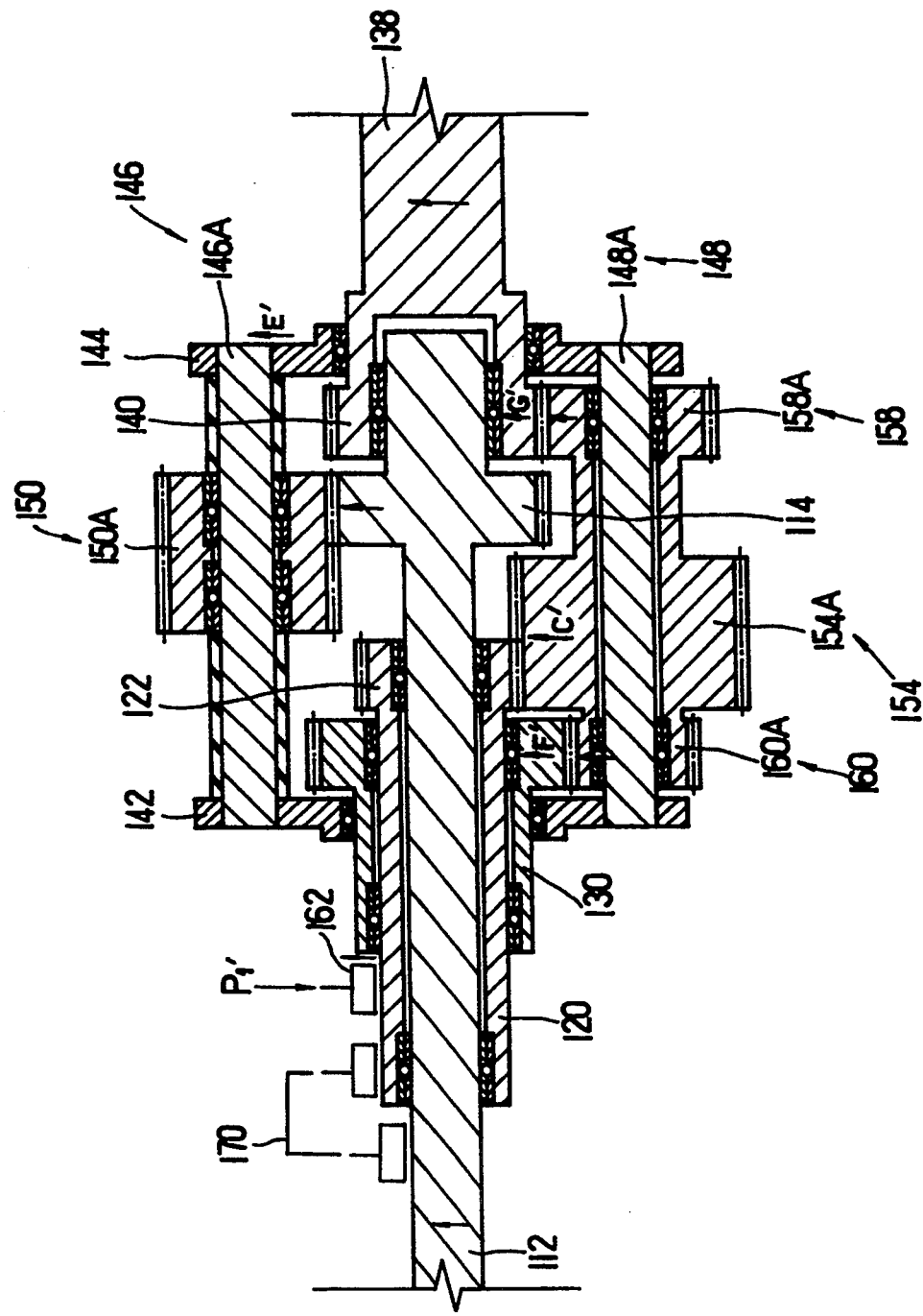

2. Forward rotation low speed state (FIG. 12)

Input shaft 112 ↑ - Input sun gear 114 ↑ - Input differential gears 150 - Low speed differential gears 154 ↑ ———

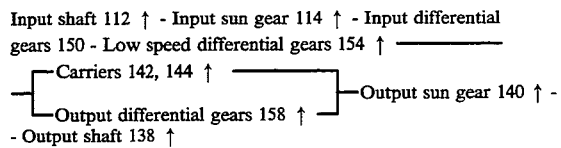

- Output shaft 138 ↑

The forward rotation low speed state is a state in which the rotation of the output shaft 138 is gradually increased from the neutral state. If in the above described neutral state a brake force P1′ is gradually applied by the low speed brake means 162 installed on the low speed control shaft 120 utilizing one-way clutching to restrict the rotational direction, the rotational force of the low speed sun gear 122 which has been rotating in a direction D′ opposite to that of the input shaft 112 is decreased and eventually stops. Therefore, the rotation of the output shaft 138 is gradually increased in proportion to the decrease of the rotation force of the low speed sun gear 122. That is, the revolution of the low speed differential gear 154A around the low speed sun gear 122 is increased in proportion to the decrease of the rotation of the low speed sun gear 122 due to the brake force P1′, accordingly the carriers 142, 144 are rotated faster in a direction E′. At the same time, the output differential gear 158A and the reverse rotation differential gear 160A integral with the low speed differential gear 154A rotate together about locking pin 148A and revolve together with the carriers 142, 144, and the revolution is increased proportionally (of course, the revolving force becomes larger when the low speed sun gear 122 stops than when its rotation is decreased). Therefore, according to the increase of the revolution of the output differential gear 158A which revolves together with the carriers, the output sun gear 140 can not rotate in a direction opposite to that of the input shaft but the rotation of the direction G′ same as the input shaft 112 is increased. This is because the influence of the revolving force of the output differential gear 158A becomes greater than the influence of the rotational force. Therefore, according to the increase of the rotation of the output sun gear 140 in the direction G′, the rotation of the output shaft 138 integral with it is gradually increased.

As a reference, since the influence of the revolving force becomes greater than that of the rotational force also for the reverse rotation differential gear 160A, the rotation of the reverse rotation sun gear 132 is further increased in the direction F′ same as that of the input shaft.

In order to further increase the rotation of the output shaft 138 from the forward rotation low speed state, the low speed control shaft 120, which has been in stationary condition, shall be rotated in a direction same as that of the input shaft by utilizing a known device making the input shaft 112 and the low speed control shaft 120 gradually rotate together or to rotate integrally. That is, the interlocking means 170 such as a torque converter, or an electric/electronic clutch, etc., is used to achieve this state. In this state, the rotation of the output shaft 138 is increased in proportion to the rotational velocity of the low speed control shaft 120 in the direction of the input shaft 112.

That is, as the low speed sun gear 122 rotates in the direction of the input shaft, the revolving force of the input, low speed, output and reverse rotation differential gear 150A, 154A, 158A, 160A revolving together with the carriers 142, 144 is gradually increased.

Figure 13:
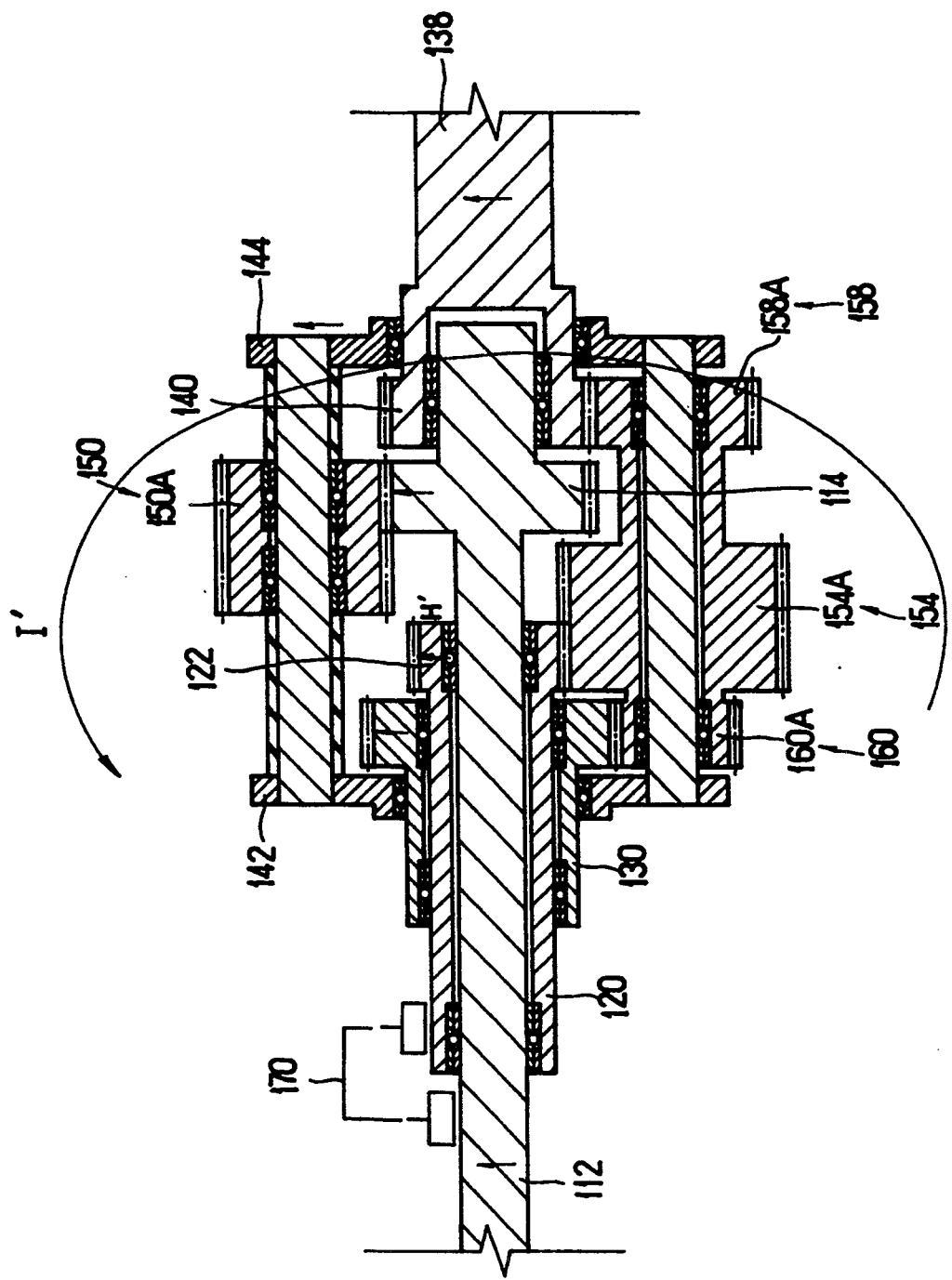

3. High speed state (FIG. 13)

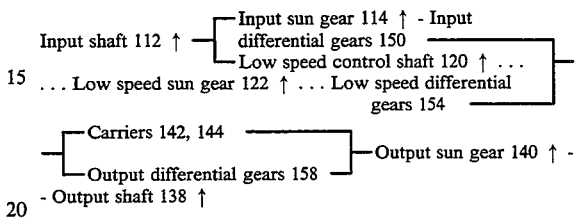

- Output shaft 138 ↑

The high speed state is a state used to further accelerate or increase the output. In this state the input shaft 112 and the low speed control shaft 120 rotate as a unit, same rotational rate, by utilizing the interlocking means 170.

In the high speed state, the rotational force passed through the input shaft 112 is transmitted into a number of paths. One path is that in which the rotation force is transmitted to the input differential gear 150A by passing through the input shaft 112 and rotating the input sun gear 114. Another path is that in which the rotational force is transmitted to the low speed differential gear 154A by integrally rotating the input shaft 112 and the low speed control shaft 120 and at the same time rotating the low speed sun gear 122 in a direction H′.

The rotational forces, after passing through these two paths, joins at the carriers 142, 144 to rotate the output shaft 138 in a direction which is the same as that of the input shaft 112. That is, since the rotations input to the input sun gear 114 and the low speed sun gear 122 are the same in their revolutions and direction, they cannot rotate the input differential gear 150A and the low speed differential gear 154A, they also cannot rotate the output differential gear 158A and the reverse rotation differential gear 160A, integral with the low speed differential gear 154A, but rotate the carriers 142, 144, the output sun gear 140 and the output shaft 138 in the same direction as the input shaft 112. In this state, all the gears and the carriers 142, 144 together form a rotating body with the two sun gears 114, 122 as the centers to rotate in a direction I′.

Here, although the interlocking means 170 is described to be used by connecting the input shaft 112 and the low speed control shaft 120, it is not limited to that. For example, connecting the input shaft 112 and the reverse rotation control shaft 130 renders the same function.

Figure 14:
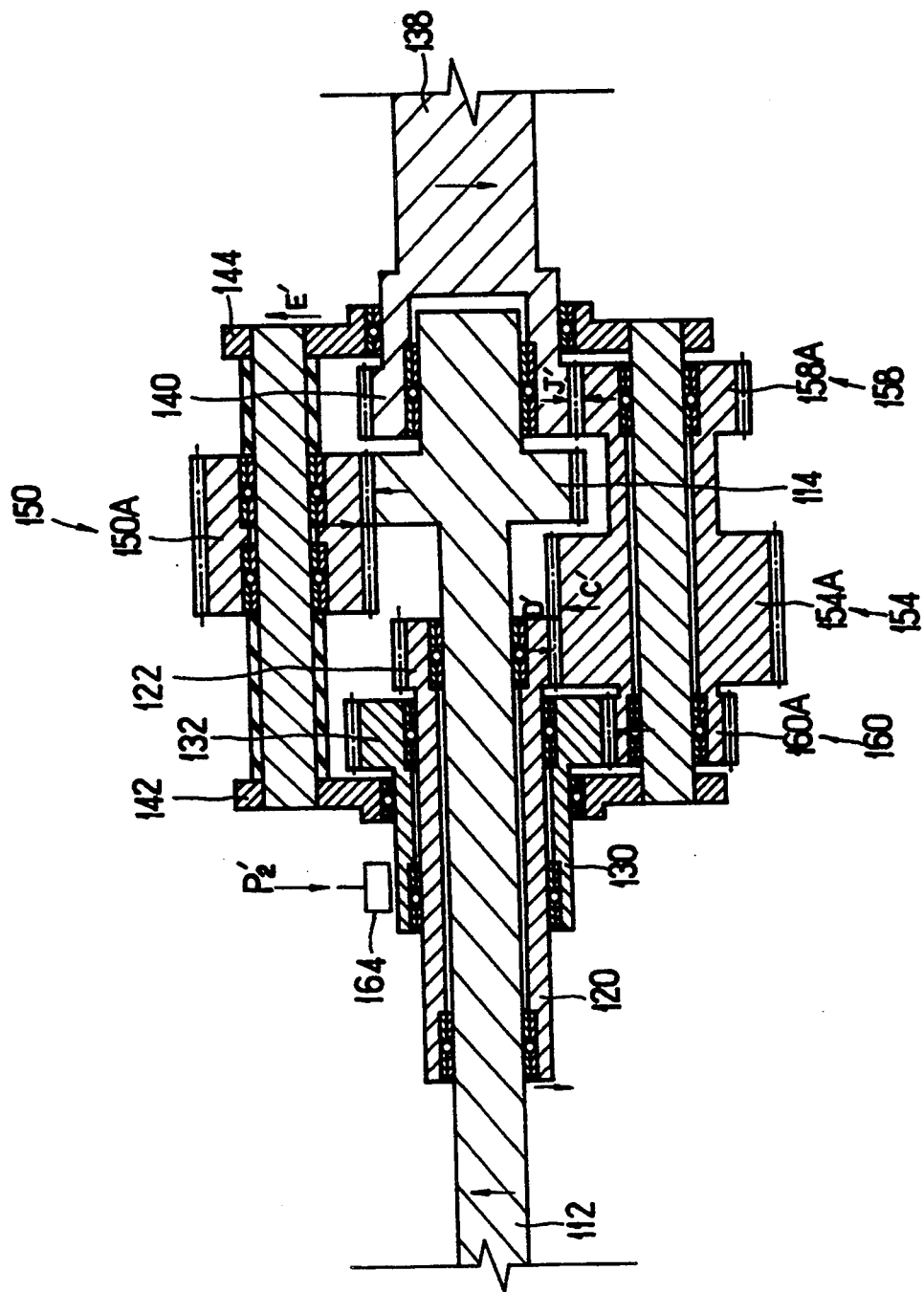

4. Reverse rotation state ( FIG. 14 )

Input shaft 112 ↑ - Input sun gear 114 ↑ - Input differential gears 150 ↓ - Low speed differential gears 154 ↑ - Reverse

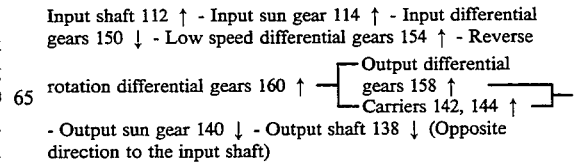

- Output sun gear 140 ↓ - Output shaft 138 ↓ (Opposite direction to the input shaft)

The reverse driving state is a state in which the output shaft 138 rotates in a direction opposite to that of the input sun gear 114 and if a brake force P2' is applied by the reverse rotation brake means 164 installed on the reverse rotation control shaft 130 in the above said neutral state, then the reverse rotation sun gear 132 which has been idling in a direction F' same as the rotational direction of the input shaft 112 in the neutral state stops and the output shaft 138 rotates in a direction opposite to that of the input sun gear 114.

tion according to the objects can obtain the required number of revolutions of the output shaft. As a reference, Table 1 presents the number of teeth of each gear in the first embodiment, and Table 2 presents the number of revolution of the output shaft (per 1 revolution of the input shaft) according to Table 1. Likewise, Table 3 refers to the number of teeth of each gear in the third embodiment, and Table 4 shows the number of revolution of the output shaft (per 1 revolution of the input shaft) according to the number of teeth in Table 3.

TABLE 1

| | (First embodiment) | | | | | | | |
|---|---|---|---|---|---|---|---|---|
| | Input sun gear (14) | Input differential gear (38) | Output differential gear (42) | Reverse rotat'n differential gear (46) | Trans- miss'n differential gear (54) | Medium speed differential gear (58) | Reverse rotat'n sun gear (18) | Out- put sun gear (24) | Medium speed sun gear (28) |
| 1 | 21 | 29 | 18 | 20 | 29 | 27 | 30 | 36 | 23 |
| 2 | 24 | 30 | 19 | 21 | 30 | 28 | 33 | 35 | 26 |
| 3 | 23 | 31 | 20 | 22 | 31 | 29 | 32 | 34 | 25 |

That is, as the reverse rotation sun gear 132 which has been rotating in a direction F' in the neutral state gradually decreases in its rotation and stops due to the brake force P2', the revolving force of the reverse rotation differential gear 160A meshed with the reverse rotation sun gear 132 around the reverse rotation sun gear is decreased proportionally, and at the same time the rotation of the output differential gear 158A and the low speed differential gear 154A integral with the reverse rotation differential gear 160A revolving together with the carriers 142, 144 is also proportionally decreased. At this time, as the revolving force of the output differential gear 158A decreases, the influence of the rotational force is increased relatively and rotates the output sun gear 140 and the output shaft 138 in a direction J', that is in opposite direction to that of the input shaft 112. As a reference, as the revolving force of the low speed differential gear 154A likewise decreases, the influence of the rotational force is increased in relatively and rotates the low speed sun gear 122 in a direction D' opposite to that of the input shaft 112.

Note that the number of teeth of each gear may be varied, and the reverse rotation state of the present application is based on the case in which the number teeth of the reverse rotation sun gear 132 is greater than that of the low speed sun gear 122, the number of the teeth of the reverse rotation sun gear 132 is greater than that of the output sun gear 140, and the number of teeth of the reverse rotation differential gear 160A is smaller than that of the output differential gear 158A, and there can be relative change between the revolving force and the rotation force of each differential gear according to the change in the number of teeth of each gear.

On the one hand, an appropriate adjustment of the numbers of teeth of the gears used in the present inven-

TABLE 2

| | Low speed control shaft (30) Stationary (Low speed) | Medium speed sun gear (28) Stationary (Medium Speed) | Reverse rotation sun gear (18) Stationary (Reverse rotation) |
|---|---|---|---|
| 1 | 0.362 | 0.655 | −0.233 |
| 2 | 0.434 | 0.668 | −0.1523 |
| 3 | 0.436 | 0.697 | −0.15 |

"−" indicates the opposite direction to the input shaft

TABLE 3

| | (Third embodiment) | | | | | | |
|---|---|---|---|---|---|---|---|
| | Input sun gear (114) | Input differential gear (150) | Low speed differential gear (154) | Output differential gear (158) | Reverse rotat'n differential gear (160) | Low speed sun gear (122) | Reverse rotat'n sun gear (132) | Output sun gear (140) |
| 1 | 30 | 24 | 33 | 24 | 18 | 21 | 36 | 30 |
| 2 | 27 | 23 | 30 | 22 | 18 | 20 | 32 | 28 |
| 3 | 28 | 24 | 30 | 23 | 19 | 22 | 33 | 29 |

TABLE 4

| | Low speed sun gear (122) Stationary (Forward rotation) | Reverse rotation sun gear (132) Stationary (Reverse rotation) |
|---|---|---|
| 1 | 0.289 | −0.187 |
| 2 | 0.274 | −0.133 |
| 3 | 0.234 | −0.131 |

"−" indicates the opposite direction to the input shaft

As described above, the continuous automatic variable speed transmission has advantages in that there is no need to install a clutch to cut the power when the power of engine is transmitted through the input shaft and output to the output shaft. Satisfactory speed adjustment is possible through the adjustment of the speed variation ratio without a change or disengagement of the gears. The reverse rotation driving, i.e. backing up, can be satisfactorily and easily performed. Further, production cost is lower due to its simple structure and smaller number of parts relative to present day transmissions. Also, the transmission of the present invention requires a smaller installation space.

The continuous automatic variable speed transmission of the present invention is not limited to the present embodiment, but can be applied to any device which transmits and outputs the driving force to the output shaft in all vehicles and industrial machines based on the principle of the present invention, and it is obvious that various modifications and alterations can be made in the scope of the present invention.

For example, in the first embodiment, if the number of teeth of the reverse rotation differential gear 46 are greater than the number of teeth of the output differential gear 42, and the number teeth of the reverse rotation sun gear 18 meshed with the reverse rotation differential gear 46 is greater than the number of teeth of the output sun gear 24, then the output shaft rotates with the lowest speed among forward rotation state which is opposite to the above described reverse rotation state.

Although the interlocking means 70 is installed to connect the reverse rotation control shaft to the input shaft, connecting the reverse rotation control shaft 16 and the low speed control shaft 30 or connecting the medium speed control shaft 26 and the carrier 34 or the output shaft 22 renders the same function.

Figure 15:
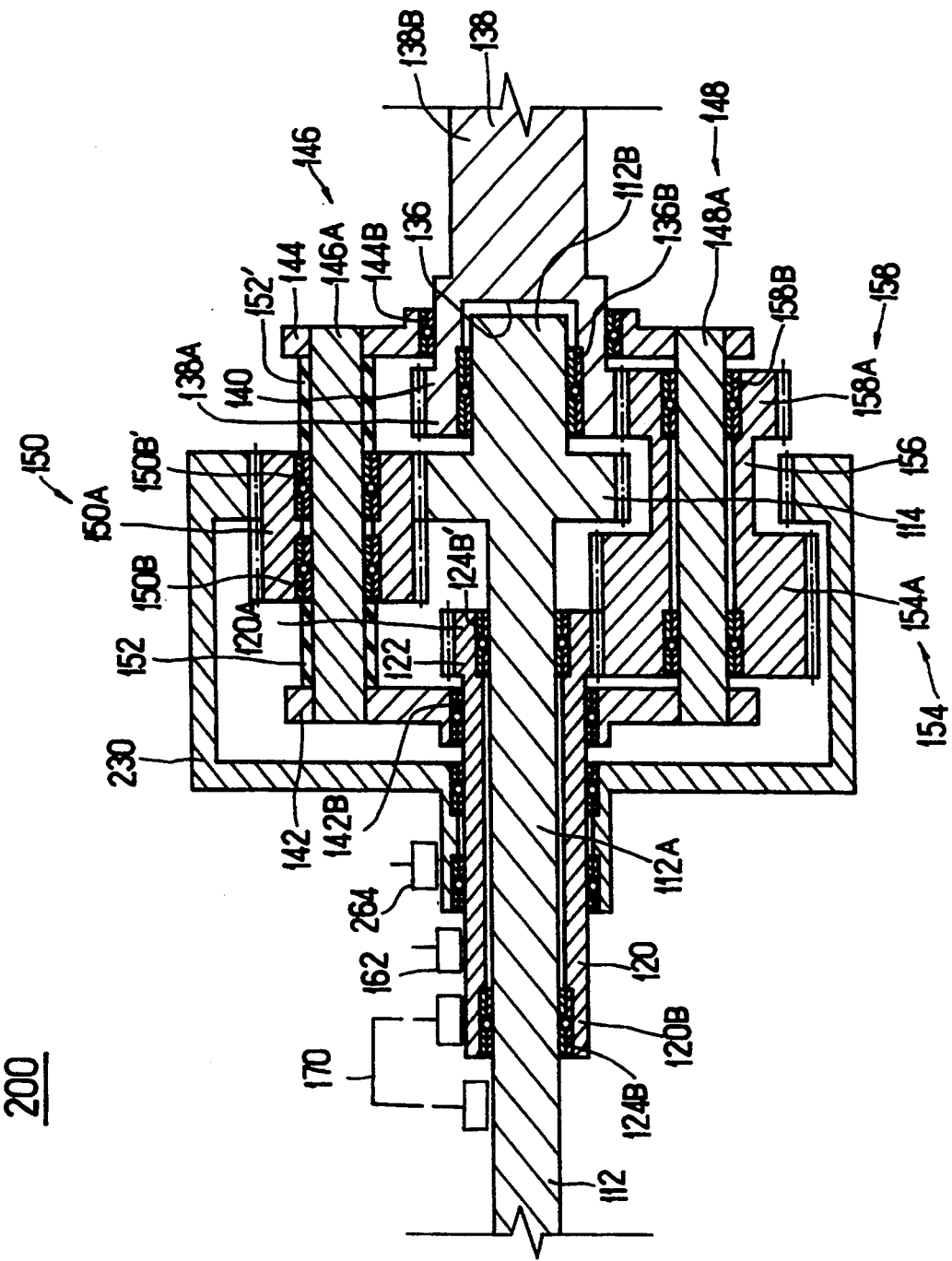
FIG. 15 is a sectional view of the fourth embodiment of the present invention.

In another embodiment 200, although the reverse rotation control shaft 130, the reverse rotation sun gear 132 and the reverse rotation differential gears 160 are used as the reverse rotation means, removing all these, providing a reverse rotation ring gear 230 instead to be meshed with the outside of the input differential gears 150, and using a reverse rotation brake members 264 renders the similar function (see FIG. 15).

As an another embodiment, if the number of teeth of the reverse rotation differential gear 160 is greater than the number of teeth of the output differential gear 158, and the number teeth of the reverse rotation sun gear 132, meshed with the reverse rotation differential gear 160, is smaller than the number of teeth of the output sun gear 140, then the output shaft rotates with the lowest speed among forward rotation state which is opposite to the above described reverse rotation state.

Although the interlocking means 170 is installed to connect the low speed control shaft 120 to the input shaft 112, connecting the reverse rotation control shaft 130 to the input shaft as an another embodiment renders the same function.

In addition, in the embodiment of the present invention, the simple braking device, such as described above, is used to apply the brake force of the brake means. However, various alterations can be made to the construction, the embodying method and the position of such means, and various circuit constructions are possible for automatic control such as hydraulic, pneumatic, electric and electronic control devices without departing from the spirit and scope of the invention. Further, various alterations can be made to the construction, the embodying method and the position of the interlocking means for the medium and high speed, the torque converter, electric/electronic, hydraulic clutch and their application is possible as a device for that purpose without departing from the spirit and scope of the invention.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention. The reference numerals in the claims are used to more clearly illustrate the invention when considered with the FIGURES and are not intended to limit the scope of the claims to the exact means so referred to by the respective numeral.

What is claimed is:

1. An automatic variable speed transmission, comprising:

an input shaft (12) with a first end (12A) and a second end (12B) for receiving rotational input and further including an input sun gear (14) secured to said input shaft between said first end (12A) and said second end (12B) of said input shaft to enable simultaneous rotation with said input shaft;

a reverse rotation control shaft (16) rotatably and coaxially mounted on said input shaft to enable independent rotation about said input shaft (12) and further including a reverse rotation sun gear (18) secured to said shaft (16) to enable simultaneous rotation with said reverse rotation control shaft (16);

an output shaft (22) having a first end (22A) and a second end (22B) with an output sun gear (24) secured to said first end (22A) of said output shaft (22) and with an axial bore (20) formed in said first end of said output shaft to coaxially receive therein said second end (12B) of said input shaft (12) to enable independent axial rotation of said output shaft (22) and said input shaft (12);

a medium speed control shaft (26) having a first end (26A) and a second end (26B) with a medium speed sun gear (28) secured to said first end (26A) of said shaft (26) with said shaft (26) being rotatably and coaxially mounted on said output shaft (22) to enable independent rotation about said output shaft (22);

a low speed control shaft (30) having a first (30A) end and a second (30B) end with a first carrier (32) formed at said first end (30A) and with said low speed control shaft being rotatably and coaxially mounted on said reverse rotation control shaft (16) to enable independent rotation about said reverse rotation control shaft;

a second carrier (34) rotatably and coaxially mounted on said medium speed control shaft (26) to enable independent rotation about said medium speed control shaft (26);

a plurality of locking pins (36,52) with each locking pin (36A,52A) of said plurality of locking pins (36,52) secured to and interlinking said first and said second carriers (32,34) to enable simultaneous rotation of said carriers (32,34);

a plurality of reverse rotation differential gears (46) with each said reverse rotation differential gear (46A) being in mechanical communication with said reverse rotation sun gear (18);

a plurality of output differential gears (42) with each said output differential gear (42A) being in mechanical communication with said output sun gear (24);

a plurality of input differential gears (38) with each said input differential gear (38A) interconnected to a reverse rotation differential gear (46A) of said plurality of reverse rotation differential gears (46) and interconnected to an output differential gear (42A) of said plurality of output differential gears (42) with said interconnected input differential gear (38A), said output differential gear (42A) and said reverse rotation differential gear (46A) rotatably mounted on a locking pin (36A) of said plurality of locking pins (36) to enable simultaneous rotation about locking pin (36A) and each said input differential gear (38A) being in mechanical communication with said input sun gear (14);

a plurality of transmission differential gears (54) with each said transmission differential gear (54A) being in mechanical communication with each said input differential gear (38A);

a plurality of medium speed differential gears (58) with each said medium speed differential gear (58A) interconnected to a transmission differential gear (54A) of said plurality of differential gears (54) and said interconnected medium speed differential gear (58A) and said transmission differential gear (54A) rotatably mounted on a locking pin (52A) of said plurality of locking pins (52) to enable simultaneous rotation about said locking pin (52A) and each said medium speed differential gear (58A) being in mechanical communication with said medium speed sun gear (28);

a low speed brake means (62) for applying rotational resistance to said low speed control shaft (30) to provide low speed rotation of said output shaft (22);

a medium speed brake means (64) for applying rotational resistance to said medium speed control shaft (26) to provide medium speed rotation of said output shaft (22);

an interlocking means (70) for coupling rotation of said input shaft (12) to said reverse rotation control shaft (16) to provide increased rotation of said output shaft upon complete interlocking such that said input shaft and said reverse rotation control shaft (16) rotate at the same speed; and a reverse rotation brake means (66) for applying rotational resistance to said reverse rotation control shaft (16) to provide reverse rotation of said output shaft (22).

2. The automatic variable speed transmission of claim 1, wherein said low speed brake means (62) includes a one-way clutch.

3. The automatic variable speed transmission of claim 1, wherein said interlocking means (70) is a fluid clutch.

4. The automatic variable speed transmission of claim 1, wherein said interlocking means (70) is a torque converter.

5. The automatic variable speed transmission of claim 1, wherein said interlocking means (70) is an electric or electronic clutch.

6. The automatic variable speed transmission of claim 1, wherein said input differential gear (38A) said output differential gear (42A) and said reverse rotation differential gear (46A) are integrally formed.

7. The automatic variable speed transmission of claim 6, wherein said input, output and reverse rotation differential gears have different numbers of teeth relative to each other.

8. The automatic variable speed transmission of claim 1, wherein said output differential gear (42A) and said reverse rotation differential gear (46A) each include a number of teeth and with said number of teeth of said reverse rotation differential gear (46A) being greater than said number of teeth of said output differential gear (42A); and wherein said output sun gear (24) and said reverse rotation sun gear (18) each include a number of teeth and with said number of teeth of said output sun gear (24) being greater than those of said reverse rotation sun gear (18).

9. An automatic variable speed transmission, comprising:

an input shaft (12) with a first end (12A) and a second end (12B) for receiving rotational input and further including an input sun gear (14) secured between said first end (12A) and said second end (12B) of said input shaft to enable simultaneous rotation with said input shaft;

a medium speed control shaft (26) having a first (26A) and a second (26B) end with a medium speed sun gear (28) secured to said first end (26A) of said shaft (26) with said shaft (26) being rotatably and coaxially mounted on said first end (12A) of said input shaft (12) to enable independent rotation about said input shaft;

an output shaft (22) having a first end (22A) and a second end (22B) with an output sun gear (24) secured to said first end (22A) of said output shaft (22) and with an axial bore (20) formed in said first end (22A) of said output shaft to coaxially receive therein said second end (12B) of said input shaft (12) to enable independent axial rotation of said output shaft (22) and said input shaft (12);

a reverse rotation control shaft (16) rotatably and coaxially mounted on said output shaft (22) to enable independent rotation about said output shaft and further including a reverse rotation sun gear (18) secured thereto to enable simultaneous rotation with said reverse rotation control shaft (16);

a low speed control shaft (30) having a first (30A) end and a second (30B) end with a first carrier (32) formed at said first end (30A) and with said low speed control shaft being rotatably and coaxially mounted on said medium speed control shaft (26) to enable independent rotation about said medium speed control shaft (26);

a second carrier (34) rotatably and coaxially mounted on said reverse rotation control shaft (16) to enable independent rotation about said shaft (16);

a plurality of locking pins (36,52) with each locking pin (36A,52A) of said plurality of locking pins (36,52) secured to and interlinking said first and said second carriers (32,34) to enable simultaneous rotation of said carriers (32,34);

a plurality of input differential gears (38) with each said input differential gear (38A) being in mechanical communication with said input sun gear (14);

a plurality of reverse rotation differential gears (46) with each said reverse rotation differential gear (46A) being in mechanical communication with said reverse rotation sun gear (18);

a plurality of output differential gears (42) with each said output differential gear (42A) interconnected to an input differential gear (38A) of said plurality of input differential gears (38) and further interconnected to a reverse rotation differential gear (46A) of said plurality of reverse rotation differential gears (46) with said interconnected output differential gear (42A), said input differential gear (38A) and said reverse rotation differential gear (46A) rotatably mounted on a locking pin (36A) of said plurality of locking pins (36) to enable simultaneous rotation about locking pin (36A) and each said output differential gear (42A) being in mechanical communication with said output sun gear (24);

a plurality of medium speed differential gears (58) with each said medium speed differential gear (58A') rotatably mounted on a locking pin (52A) of said plurality of locking pins (52) and each said medium speed differential gear (58A') being in mechanical communication with said medium speed sun gear (28) and one of said plurality of input differential gears (38);

a low speed brake means (62) for applying rotational resistance to said low speed control shaft (30) to provide low speed rotation of said output shaft (22);

a medium speed brake means (64) for applying rotational resistance to said medium speed control shaft (26) to provide medium speed rotation of said output shaft (22);

an interlocking means (70) for coupling rotation of said input shaft (12) to said medium speed control shaft (26) to produce an increase in rotation of said output shaft upon partial interlocking and to provide high speed rotation of said output shaft upon complete interlocking such that said input shaft and said medium speed control shaft rotate at the same speed; and a reverse rotation brake means (66) for applying rotational resistance to said reverse rotation control shaft (16) to provide reverse rotation of said output shaft (22).

10. An automatic variable speed transmission, comprising:

an input shaft (112) with a first end (112A) and a second end (112B) for receiving rotational input and further including an input sun gear (114) secured to said input shaft (112) between said first end (112A) and said second end (112B) of said input shaft to enable simultaneous rotation with said input shaft (112);

a low speed control shaft (120) having a first end (120A) and a second end (120B) with a low speed sun gear (122) secured to said first end (120A) of said shaft (120) and with said shaft (120) being rotatably and coaxially mounted on said first end (112A) of said input shaft to enable independent rotation about said input shaft;

a reverse rotation control shaft (130) rotatably and coaxially mounted on said low speed control shaft (120) to enable independent rotation about said low speed control shaft and further including a reverse rotation sun gear (132) secured to said shaft (130) to enable simultaneous rotation with said reverse rotation control shaft (130);

an output shaft (138) having a first end (138A) and a second end (138B) with an output sun gear (140) secured to said first end (138A) of said output shaft (138) and with an axial bore (136) formed in said first end of said output shaft to coaxially receive therein said second end (112B) of said input shaft (112) to enable independent axial rotation of said output shaft (138) and said input shaft (112);

a first carrier (142) rotatably and coaxially mounted on said reverse control shaft (130) to enable independent rotation about said reverse control shaft (130);

a second carrier (144) rotatably and coaxially mounted on said output shaft (138) to enable independent rotation about said output shaft (138);

a plurality of locking pins (146, 148) with each locking pin (146A, 148A) of said plurality of locking pins (146, 148) secured to and interlinking said first and said second carriers (142, 144) to enable simultaneous rotation of said carriers (142, 144);

a plurality of input differential gears (150) with each said input differential gear (150A) rotatably mounted on a locking pin (146A) of said plurality of locking pins (146) and each said input differential gear (150A) being in mechanical communication with said input sun gear (114);

a plurality of output differential gears (158) with each said output differential gear (158A) being in mechanical communication with said output sun gear (140);

a plurality of reverse rotation differential gears (160) with each said reverse rotation differential gear (160A) being in mechanical communication with said reverse rotation sun gear (132);

a plurality of low speed differential gears (154) with each said low speed differential gear (154A) interconnected to a reverse rotation differential gear (160A) of said plurality of reverse rotation differential gears (160) and further interconnected to an output differential gear (158A) of said output differential gears (158) with said interconnected low speed differential (154A), reverse rotation differential gear (160A) and output differential gear (158A) being rotatably mounted on each said locking pin (148A) to enable simultaneous rotation about locking pin (148A) and each said low speed differential gear (154A) being in mechanical communication with said input sun gear (122) and one of said plurality of input differential gears (150);

a low speed brake means (162) for applying rotational resistance to said low speed control shaft (120) to provide a low speed rotation of said output shaft;

an interlocking means (170) for coupling said input shaft (112) to said low speed control shaft (120) to provide increased rotation of said output shaft upon partial coupling and to provide high speed rotation of said output shaft upon complete coupling such that said input shaft and said low speed control shaft (120) rotate at the same speed; and a reverse rotation brake means (164) for applying rotational resistance to said reverse rotation control shaft (130) to provide reverse rotation of said output shaft.

11. The automatic variable speed transmission of claim 10, wherein said low speed brake means (162) includes a one-way clutch.

12. The automatic variable speed transmission of claim 10, wherein said interlocking means (170) is a fluid clutch.

13. The automatic variable speed transmission of claim 10, wherein said interlocking means (170) is a torque converter.

14. The automatic variable speed transmission of claim 10, wherein said interlocking means (170) is an electric or electronic clutch.

15. The automatic variable speed transmission of claim 10, wherein said low speed differential gear (154A), said output differential gear (158A) and said reverse rotation differential gear (160A) are integrally formed.

16. The automatic variable speed transmission of claim 10, wherein said input differential gear (154A), said output differential gear (158A) and said reverse rotation differential gear (160A) have different numbers of teeth relative to each other.

17. The automatic variable speed transmission of claim 10, wherein said output differential gear (158A) and said reverse rotation differential gear (160A) each include a number of teeth and with said reverse rotation differential gear (160A) is smaller than said number of teeth of said output differential gear (158A); and said output sun gear (140) and said reverse rotation sun gear (132) each include a number of teeth with said number of teeth of said output sun gear (140) being smaller than those of said reverse rotation sun gear (132).

18. An automatic variable speed transmission, comprising:

an input shaft (112) with a first end (112A) and a second end (112B) for receiving rotational input and further including an input sun gear (114) secured to said shaft (112) between said first end (112A) and said second end (112B) of said input shaft to enable simultaneous rotation with said input shaft;

a low speed control shaft (120) having a first end (120A) and a second end (120B) with a low speed sun gear (122) secured to said first end (120A) of said shaft (120) and with said shaft (120) being rotatably and coaxially mounted on said first end (112A) of said input shaft to enable independent rotation about said input shaft;

an output shaft (138) having a first end (138A) and a second end (138B) with an output sun gear (140) secured to said first end (138A) of said output shaft (138) and with an axial bore (136) formed in said first end of said output shaft to coaxially receive therein said second end (112B) of said input shaft (112) to enable independent axial rotation of said output shaft (138) and said input shaft (112);

a first carrier (142) rotatably and coaxially mounted on said low speed control shaft (120) to enable independent rotation about said low speed control shaft;

a second carrier (144) rotatably and coaxially mounted on said output shaft (138) to enable independent rotation about said output shaft;

a plurality of locking pins (146, 148) with each locking pin (146A, 148A) of said plurality of locking pins (146, 148) secured to and interlinking said first and said second carriers (142, 144) to enable simultaneous rotation of said carriers (142, 144);

a plurality of input differential gears (150) with each said input differential gear (150A) rotatably mounted on a locking pin (146A) of said plurality of locking pins (146) and each said input differential gear (150A) being in mechanical communication with said input sun gear (114);

a plurality of low speed differential gears (154) with each said low speed differential gear (154A) being in mechanical communication with each said input differential gear (150A) and said low speed sun gear (122);

a plurality of output differential gears (158) with each said output differential gear (158A) interconnected to a low speed differential gear (154A) of said plurality of low speed differential gears (154A) with said interconnected output differential gear (158A) and low speed differential gear (154A) being rotatably mounted on each said locking pin (148A) and with each output differential gear being in mechanical communication with said output sun gear (140);

a reverse rotation ring gear (230) in mechanical communication with said input differential gear (150A);

a low speed brake means (162) for applying rotational resistance to said low speed control shaft (120) to provide low speed rotation of said output shaft;

an interlocking means (170) for coupling said input shaft (112) to said low speed control shaft (120) to provide increased rotation of said output shaft upon partial coupling of said shafts (112, 120) and to provide medium and high rotational speed of said output shaft; and a reverse rotation brake means (264) for applying rotational resistance to said reverse rotation ring gear (230) to provide reverse rotation of said output shaft (138).

19. The automatic variable speed transmission of claim 18, wherein said interlocking means (170) is a fluid clutch.

20. The automatic variable speed transmission of claim 18, wherein said interlocking means (170) is a torque converter.

21. The automatic variable speed transmission of claim 18, wherein said interlocking means (170) is an electric or electronic clutch.

* * * * *

UNITED STATES PATENT AND TRADEMARK OFFICE
CERTIFICATE OF CORRECTION

PATENT NO. : 5,364,320

DATED : November 15, 1994

INVENTOR(S) : Ra et al.

It is certified that error appears in the above-identified patent and that said Letters Patent is hereby corrected as shown below:

item [57], Title page Abstract, line 3 "or" should read --for--

Col. 10, line 45 "38↑" should read --38↓--

Col. 10, line 46 "42↑" should read --42↓--

Col. 13, line 66 delete " . " after the word "shaft"

Signed and Sealed this

Seventeenth Day of December, 1996

Attest:

BRUCE LEHMAN

Attesting Officer    Commissioner of Patents and Trademarks